United States Patent
Chun et al.

(10) Patent No.: US 8,279,824 B2
(45) Date of Patent: Oct. 2, 2012

(54) METHOD OF TRANSMITTING CONTROL SIGNAL IN WIRELESS COMMUNICATION SYSTEM

(75) Inventors: Jin Young Chun, Anyang-si (KR); Bin Chul Ihm, Anyang-si (KR)

(73) Assignee: LG Electronics Inc., Seoul (KR)

( * ) Notice: Subject to any disclaimer, the term of this patent is extended or adjusted under 35 U.S.C. 154(b) by 259 days.

(21) Appl. No.: 12/744,377

(22) PCT Filed: Nov. 26, 2008

(86) PCT No.: PCT/KR2008/006966
§ 371 (c)(1),
(2), (4) Date: May 24, 2010

(87) PCT Pub. No.: WO2009/069936
PCT Pub. Date: Jun. 4, 2009

(65) Prior Publication Data
US 2010/0254483 A1    Oct. 7, 2010

Related U.S. Application Data

(60) Provisional application No. 60/991,206, filed on Nov. 29, 2007, provisional application No. 61/049,770, filed on May 2, 2008.

(30) Foreign Application Priority Data

Apr. 8, 2008  (KR) .................. 10-2008-0032805
Jun. 5, 2008  (KR) .................. 10-2008-0053047

(51) Int. Cl.
H04W 4/00 (2009.01)
(52) U.S. Cl. ...................................... 370/329
(58) Field of Classification Search .......... 370/310–349, 370/464–490
See application file for complete search history.

(56) References Cited

U.S. PATENT DOCUMENTS

| 6,545,997 | B1 | 4/2003 | Bohnke et al. | |
|---|---|---|---|---|
| 7,185,256 | B2 | 2/2007 | Miki et al. | |
| 2004/0190482 | A1* | 9/2004 | Baum et al. | 370/347 |
| 2005/0286408 | A1* | 12/2005 | Jin et al. | 370/208 |
| 2007/0009054 | A1 | 1/2007 | Kwak et al. | |
| 2007/0058595 | A1* | 3/2007 | Classon et al. | 370/337 |
| 2007/0153929 | A1 | 7/2007 | Ballentin et al. | |
| 2007/0165731 | A1* | 7/2007 | Xiao et al. | 375/260 |
| 2007/0195899 | A1 | 8/2007 | Bhushan et al. | |
| 2007/0217362 | A1 | 9/2007 | Kashima et al. | |

(Continued)

FOREIGN PATENT DOCUMENTS

KR    10-0606099    7/2006

(Continued)

Primary Examiner — Andrew Lai
Assistant Examiner — Juvena Loo
(74) Attorney, Agent, or Firm — McKenna Long & Aldridge LLP

(57) ABSTRACT

A method of transmitting control signals in a wireless communication system includes transmitting a first control signal via a control channel region comprising a plurality of tiles composed of a plurality of subcarriers contiguous in a frequency domain on a plurality of OFDM symbols in a time domain, and transmitting a second control signal via the control channel region, wherein the plurality of tiles included in the control channel region are distributedly or contiguously disposed within a basic range of the control channel region, a range within which the plurality of tiles are distributed in the time domain. Control channel regions can be configured in various manners, so control signals can be adaptively transmitted in various channel environments.

5 Claims, 16 Drawing Sheets

U.S. PATENT DOCUMENTS

| | | | |
|---|---|---|---|
| 2007/0223364 A1* | 9/2007 | Terabe et al. | 370/208 |
| 2007/0242636 A1 | 10/2007 | Kashima et al. | |
| 2007/0258404 A1* | 11/2007 | Tirkkonen et al. | 370/329 |
| 2007/0268816 A1 | 11/2007 | Hosein | |
| 2008/0167040 A1 | 7/2008 | Khandekar et al. | |
| 2009/0245197 A1* | 10/2009 | Ma et al. | 370/330 |
| 2009/0262699 A1* | 10/2009 | Wengerter et al. | 370/330 |

FOREIGN PATENT DOCUMENTS

| | | |
|---|---|---|
| KR | 10-2007-0080191 | 8/2007 |

* cited by examiner

Fig. 22

```
         t      6 OFDM symbols
   ┌──→
   │         ┌──┬─┬──┬──┬─┬──┐
   ↓         │S1│P │S2│X1│P │X2│
   f  Tile 1 │S1│P │S2│X1│P │X2│
            │S1│P │S2│X1│P │X2│
            │S1│P │S2│X1│P │X2│
            └──┴─┴──┴──┴─┴──┘

┌──┬─┬──┬──┬─┬──┐
            │X3│P │X4│S3│P │S4│
     Tile 2 │X3│P │X4│S3│P │S4│
            │X3│P │X4│S3│P │S4│
            │X3│P │X4│S3│P │S4│
            └──┴─┴──┴──┴─┴──┘

┌──┬─┬──┬──┬─┬──┐
            │S5│P │S6│X5│P │X6│
     Tile 3 │S5│P │S6│X5│P │X6│
            │S5│P │S6│X5│P │X6│
            │S5│P │S6│X5│P │X6│
            └──┴─┴──┴──┴─┴──┘

⋮

┌───┬─┬───┬───┬─┬───┐
            │X11│P │X12│S11│P │S12│
     Tile 6 │X11│P │X12│S11│P │S12│
            │X11│P │X12│S11│P │S12│
            │X11│P │X12│S11│P │S12│
            └───┴─┴───┴───┴─┴───┘
```

Fig. 23

```
         t      9 OFDM symbols
   ┌──→
   │         ┌──┬─┬──┬──┬─┬──┬──┬─┬──┐
   ↓         │S1│P │S2│X1│P │X2│Y1│P │Y2│
   f  Tile 1 │S1│P │S2│X1│P │X2│Y1│P │Y2│
            │S1│P │S2│X1│P │X2│Y1│P │Y2│
            │S1│P │S2│X1│P │X2│Y1│P │Y2│
            └──┴─┴──┴──┴─┴──┴──┴─┴──┘

┌──┬─┬──┬──┬─┬──┬──┬─┬──┐
            │Y3│P │Y4│S3│P │S4│X3│P │X4│
     Tile 2 │Y3│P │Y4│S3│P │S4│X3│P │X4│
            │Y3│P │Y4│S3│P │S4│X3│P │X4│
            │Y3│P │Y4│S3│P │S4│X3│P │X4│
            └──┴─┴──┴──┴─┴──┴──┴─┴──┘

┌──┬─┬──┬──┬─┬──┬──┬─┬──┐
            │X5│P │X6│Y5│P │Y6│S5│P │S6│
     Tile 3 │X5│P │X6│Y5│P │Y6│S5│P │S6│
            │X5│P │X6│Y5│P │Y6│S5│P │S6│
            │X5│P │X6│Y5│P │Y6│S5│P │S6│
            └──┴─┴──┴──┴─┴──┴──┴─┴──┘

⋮

┌───┬─┬───┬───┬─┬───┬───┬─┬───┐
            │X11│P │X12│Y11│P │Y12│S11│P │S12│
     Tile 6 │X11│P │X12│Y11│P │Y12│S11│P │S12│
            │X11│P │X12│Y11│P │Y12│S11│P │S12│
            │X11│P │X12│Y11│P │Y12│S11│P │S12│
            └───┴─┴───┴───┴─┴───┴───┴─┴───┘
```

Fig. 30

12 OFDM symbols

| tile→ | 1-4 | P | 5-8 | P | 9-12 | P |
|---|---|---|---|---|---|---|
| | 13-16 | P | 17-20 | P | 21-24 | P |
| | 25-28 | P | 29-32 | P | 33-36 | P |
| | | | | | | |
| | 9-12 | P | 1-4 | P | 5-8 | P |
| | 21-24 | P | 13-16 | P | 17-20 | P |
| | 33-36 | P | 25-28 | P | 29-32 | P |
| | | | | | | |
| | 5-8 | P | 9-12 | P | 1-4 | P |
| | 17-20 | P | 21-24 | P | 13-16 | P |
| | 29-32 | P | 33-36 | P | 25-28 | P |

Fig. 31

12 OFDM symbols

| tile→ | 1-8 | P | P | 1-8 | 9-16 | P | P | 9-16 | 17-24 | P | P | 17-24 |
|---|---|---|---|---|---|---|---|---|---|---|---|---|
| | 25-32 | P | P | 25-32 | 33-40 | P | P | 33-40 | 41-48 | P | P | 41-48 |
| | 49-56 | P | P | 49-56 | 57-64 | P | P | 57-64 | 65-72 | P | P | 65-72 |
| | | | | | | | | | | | | |
| | 17-24 | P | P | 17-24 | 1-8 | P | P | 1-8 | 9-16 | P | P | 9-16 |
| | 41-48 | P | P | 41-48 | 25-32 | P | P | 25-32 | 33-40 | P | P | 33-40 |
| | 65-72 | P | P | 65-72 | 49-56 | P | P | 49-56 | 57-64 | P | P | 57-64 |
| | | | | | | | | | | | | |
| | 9-16 | P | P | 9-16 | 17-24 | P | P | 17-24 | 1-8 | P | P | 1-8 |
| | 33-40 | P | P | 33-40 | 41-48 | P | P | 41-48 | 25-32 | P | P | 25-32 |
| | 57-64 | P | P | 57-64 | 65-72 | P | P | 65-72 | 49-56 | P | P | 49-56 |

Fig. 32

9 OFDM symbols

| tile→ 1-4 | P | 1-4 | 13-16 | P | 13-16 | 25-28 | P | 25-28 |
|---|---|---|---|---|---|---|---|---|
| 5-8 | P | 5-8 | 17-20 | P | 17-20 | 29-32 | P | 29-32 |
| 9-12 | P | 9-12 | 21-24 | P | 21-24 | 33-36 | P | 33-36 |

| 25-28 | P | 25-28 | 1-4 | P | 1-4 | 13-16 | P | 13-16 |
|---|---|---|---|---|---|---|---|---|
| 29-32 | P | 29-32 | 5-8 | P | 5-8 | 17-20 | P | 17-20 |
| 33-36 | P | 33-36 | 9-12 | P | 9-12 | 21-24 | P | 21-24 |

| 13-16 | P | 13-16 | 25-28 | P | 25-28 | 1-4 | P | 1-4 |
|---|---|---|---|---|---|---|---|---|
| 17-20 | P | 17-20 | 29-32 | P | 29-32 | 5-8 | P | 5-8 |
| 21-24 | P | 21-24 | 33-36 | P | 33-36 | 9-12 | P | 9-12 |

METHOD OF TRANSMITTING CONTROL SIGNAL IN WIRELESS COMMUNICATION SYSTEM

This application is a national phase application based on International Application No. PCT/KR2008/006966, filed on Nov. 26, 2008, which claims priority to U.S. Provisional Application No. 60/991,206, filed on Nov. 29, 2007, U.S. Provisional Application No. 61/049,770, filed on May 2, 2008, Korean Patent Application No. 10-2008-0032805, filed on Apr. 8, 2008 and Korean Patent Application No. 10-2008-0053047, filed on Jun. 5, 2008, all of which are incorporated by reference for all purposes as if fully set forth herein.

TECHNICAL FIELD

The present invention relates to wireless communications and, more particularly, to a method of transmitting a control signal via a control channel.

BACKGROUND ART

An IEEE (Institute of Electrical and Electronics Engineers) 802.16 standards provide techniques and protocols to support a broadband wireless access. Standardization proceeded starting from 1999 and IEEE 802.16-2001 was approved in 2001. It is based on a single carrier physical layer called 'WirelessMAN-SC'. Later, besides the 'WirelessMAN-SC', 'WirelessMAN-OFDM' and 'WirelessMAN-OFDMA' were added to the physical layer in IEEE 802.16a standards approved in 2003. After the IEEE 802.16a standards were completed, revised IEEE 802.16-2004 standards were approved in 2004. IEEE 802.16-2004/Cor1 was completed in the form of 'corrigendum' in 2005 in order to resolve and correct bugs and errors of the IEEE 802.16-2004 standards.

One of systems considered in the next generation is an OFDM (Orthogonal Frequency Division Multiplexing) system that can attenuate an inter-symbol interference effect with a low complexity. The OFDM converts serially inputted data symbols into the N number of parallel data symbols, carries them in the N number of separated subcarriers, and transmits the same. The subcarriers maintain orthogonality in a frequency domain. The respective orthogonal channels experience mutually independent frequency selective fading, and the intervals of transmitted symbols are lengthened to minimize the inter-symbol interference. OFDMA refers to a multi-access scheme accomplishing multiple accesses by independently providing portions of available subcarriers to each user in a system using the OFDM as a modulation scheme. The OFDMA provides frequency resources called subcarriers to each user, and in general, the respective frequency resources are independently provided to multiple users so as not to overlap with each other. That is, resultantly, frequency resources are mutually exclusively allocated to the users.

In the OFDMA system, frequency diversity can be obtained for multiple users through frequency selective scheduling, and subcarriers can be allocated in various forms according to permutation with respect to the subcarriers. The efficiency of a space domain can be enhanced according to a space multiplexing scheme using multiple antennas. In order to support such various schemes, a control signal should be necessarily transmitted between a UE (user equipment (UE)) and a base station. The control signal includes a CQI (Channel Quality Indicator) reporting a channel state by the UE to the base station, an ACK/NACK (Acknowledgement/Not-acknowledgement) signal in response to a data transmission, precoding information or antenna information in a multi-antenna system, or the like.

As the functions of the system is diversified, control signals to be transmitted vary in their types. The increase in the transmitted control signals in limited radio resources leads to a reduction of radio resources for user data as many.

Thus, a method for effectively transmitting various control signals by effectively using limited radio resources is required.

DISCLOSURE OF INVENTION

Technical Problem

Therefore, an object of the present invention is to provide a method for effectively transmitting control signals.

Technical Solution

In an aspect, a method of transmitting control signals in a wireless communication system includes transmitting a first control signal via a control channel region comprising a plurality of tiles composed of a plurality of subcarriers contiguous in a frequency domain on a plurality of OFDM symbols in a time domain, and transmitting a second control signal via the control channel region, wherein the plurality of tiles included in the control channel region are distributedly or contiguously disposed within a basic range of the control channel region, a range within which the plurality of tiles are distributed in the time domain.

In another aspect, a method of transmitting control signals in a wireless communication system includes allocating an allocation block comprising at least one tile in a time domain and at least one tile in a frequency domain, the tiles comprising a plurality of subcarriers contiguous in the time domain and in the frequency domain, disposing some of a plurality of tiles included in a first control channel region for transmitting a first control signal at the allocation block, disposing some of a plurality of tiles included in a second control channel region for transmitting a second control signal at the allocation block, including the first control signal in the allocation block and transmitting the same, and including the second control signal in the allocation block and transmitting the same.

Advantageous Effects

In the present invention, control channel regions can be configured in various manners, so control signals can be adaptively transmitted in various channel environments.

BRIEF DESCRIPTION OF THE DRAWINGS

FIG. 22 shows a method of carrying a control signal on a control channel region according to another embodiment of the present invention.

FIG. 23 shows a method of carrying a control signal on a control channel region according to still another embodiment of the present invention.

FIG. 30 shows a method of carrying a control signal on a control channel region according to still another embodiment of the present invention.

FIG. 31 shows a method of carrying a control signal on a control channel region according to still another embodiment of the present invention.

FIG. 32 shows a method of carrying a control signal on a control channel region according to still another embodiment of the present invention.

MODE FOR THE INVENTION

Figure 1:
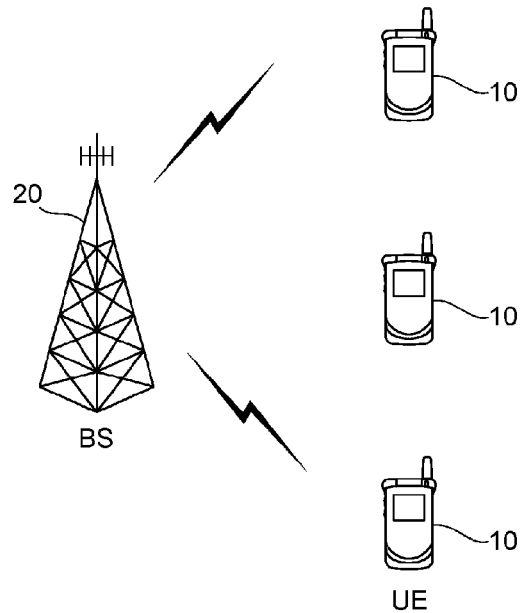
FIG. 1 shows an example of a wireless communication system.

FIG. 1 shows a wireless communication system. The wireless communication system can be widely deployed to provide a variety of communication services, such as voices, packet data, etc.

Referring to FIG. 1, the wireless communication system includes a base station (BS) 20 and user equipments (UEs) 10. The UEs 10 may be fixed or have mobility, and may be referred to as another terminology, such as a mobile station (MS), a user terminal (UT), a subscriber station (SS), a wireless device, etc. The BS 20 generally refers to a fixed station that communicates with the UEs 10 and may be called another terminology, such as a node-B, a base transceiver system (BTS), an access point, etc. There are one or more cells within the coverage of the BS 20.

Hereinafter, downlink refers to communication link from the BS 20 to the UEs 10, and uplink refers to communication link from the UEs 10 to the BS 20. In the downlink, a transmitter may be a part of the BS 20, and a receiver may be a part of the UEs 10. In the uplink, a transmitter may be a part of the UEs 10, and a receiver may be a part of the BS 20.

The wireless communication system may be an OFDM (Orthogonal Frequency Division Multiplexing)/OFDMA (Orthogonal Frequency Division Multiple Access)-based system. The OFDM uses a plurality of orthogonal subcarriers. The OFDM uses orthogonality between IFFT (Inverse Fast Fourier Transform) and FFT (Fast Fourier Transform). A transmitter performs IFFT on data and transmits the same. A receiver performs FFT on a reception signal to restore the original data. The transmitter uses IFFT to combine multiple subcarriers, and the receiver uses corresponding FFT to separate the multiple subcarriers.

Figure 2:
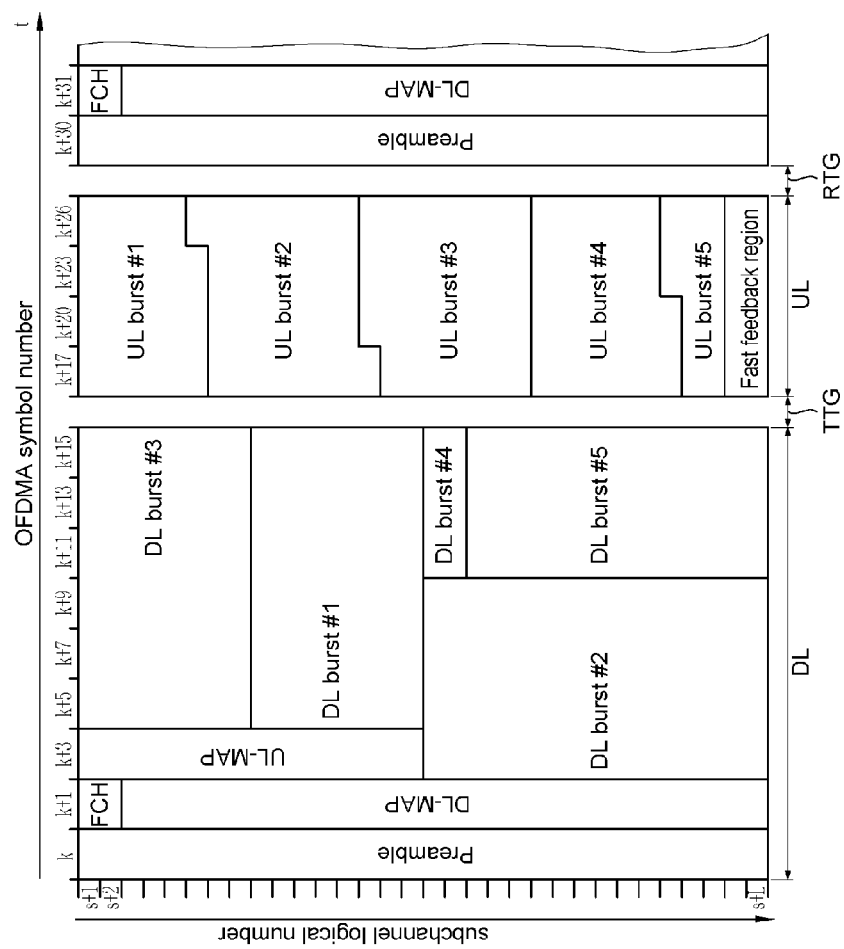
FIG. 2 is a drawing illustrating an example of a frame structure.

FIG. 2 shows an example of a frame structure. The frame refers to a data sequence during a fixed time period used by physical specifications. It may refer to 8.4.4.2 paragraph of "Part 16: Air Interface for Fixed Broadband Wireless Access Systems" of IEEE standards 802.16-2004 (Reference document 1).

Referring to FIG. 2, the frame includes a downlink frame and an uplink frame. Time division duplex (TDD) refers to a method in which uplink and downlink transmissions share the same frequency but occur at each different time. The downlink frame temporally goes ahead of the uplink frame. The downlink frame includes a preamble, a frame control header (FCH), a DL (Downlink)-MAP, a UL (Uplink)-MAP, a burst region, starting in this order. A guard time for discriminating the uplink frame and the downlink frame is inserted into a middle portion of the frame (i.e., between the downlink frame and the uplink frame), and to a final portion (after the uplink frame). A transmit/receive transition gap (TTG) refers to a gap between the downlink burst and the subsequent uplink burst. A receive/transmit transition gap (RTG) refers to a gap between the uplink burst and a subsequent downlink burst.

The preamble is used for initial synchronization, cell search, frequency offset, and channel estimation between a base station and a UE. The FCH includes the length of a DL-MAP message and coding information of the DL-MAP message.

The DL-MAP is a region on which the DL-MAP message is transmitted. The DL-MAP message defines an access of a downlink channel. The DL-MAP message includes a configuration change count of a DCD (Downlink Channel Descriptor) and a base station ID (Identifier). The DCD describes a downlink burst profile applied to a current map. The downlink burst profile refers to characteristics of a downlink physical channel, and the DCD is periodically transmitted by the base station via a DCD message.

The UL-MAP is a region on which a UL-MAP message is transmitted. The UL-MAP message defines an access of an uplink channel. The UL-MAP message includes a configuration change count of a UCD (Uplink Channel Descriptor) and a valid start time of uplink allocation defined by the UL-MAP. The UCD describes an uplink burst profile. The uplink burst profile refers to characteristics of an uplink physical channel, and the UCD is periodically transmitted by the base station via a UCD message.

A portion of the uplink frame includes a fast feedback region. The fast feedback region, which is a region allocated for a faster uplink transmission than general uplink data, may include various information such as a CQI, an ACK/NACK signal, precoding code book information, antenna information, or the like.

Hereinafter, a slot is a minimum available data allocation unit and defined as time and a subchannel. The number of subchannels depends upon the size of FFT and time-frequency mapping. Subchannels include a plurality of subcarriers. The number of subcarriers per subchannel differs depending on permutations. Permutation refers to mapping of a logical subchannel to a physical subcarrier. In full usage of subchannels (FUSC), a subchannel includes 48 subcarriers, and in a partial usage of subchannels (PUSC), a subchannel includes 24 or 16 subcarriers. A segment refers to at least one subchannel set.

Data of a physical layer is mapped to a physical subcarrier through two steps. In a first step, data is mapped to at least one data slot in at least one logical subchannel. In a second step, each logical subchannel is mapped to physical subcarriers. This is called permutation. Reference document 1 discloses permutations such as FUSC, PUSC, O-FUSC (Optional-FUSC), O-PUSC (Optional-PUSC), AMC (Adaptive Modulation and Coding), or the like. A set of OFDM symbols using the same permutation is called a permutation zone, and a frame includes at least one permutation zone.

The FUSC and the O-FUSC are used only for downlink transmission. The FUSC includes a single segment including every subchannel group. Each subchannel is mapped to a physical subcarrier distributed in the entire physical channels. This mapping changes for each OFDM symbol. A slot includes a single subchannel in a single OFDM symbol. The O-FUSC has a different pilot allocation method from that of the FUSC.

The PUSC is used for both downlink transmission and uplink transmission. In downlink, respective physical channels are divided into clusters each having 14 contiguous subcarriers in two OFDM symbols. The physical channels are mapped to six groups. In each group, pilot is allocated to each cluster and is in a fixed position. In the uplink, each subcarrier may include a plurality of tiles including four contiguous physical subcarriers on three OFDM symbols. Each subchannel includes six tiles. The O-PUSC is used only for uplink transmission, and each tile includes three continuous physical subcarriers on three OFDM symbols. At least one pilot may be allocated to each tile.

Figure 3:
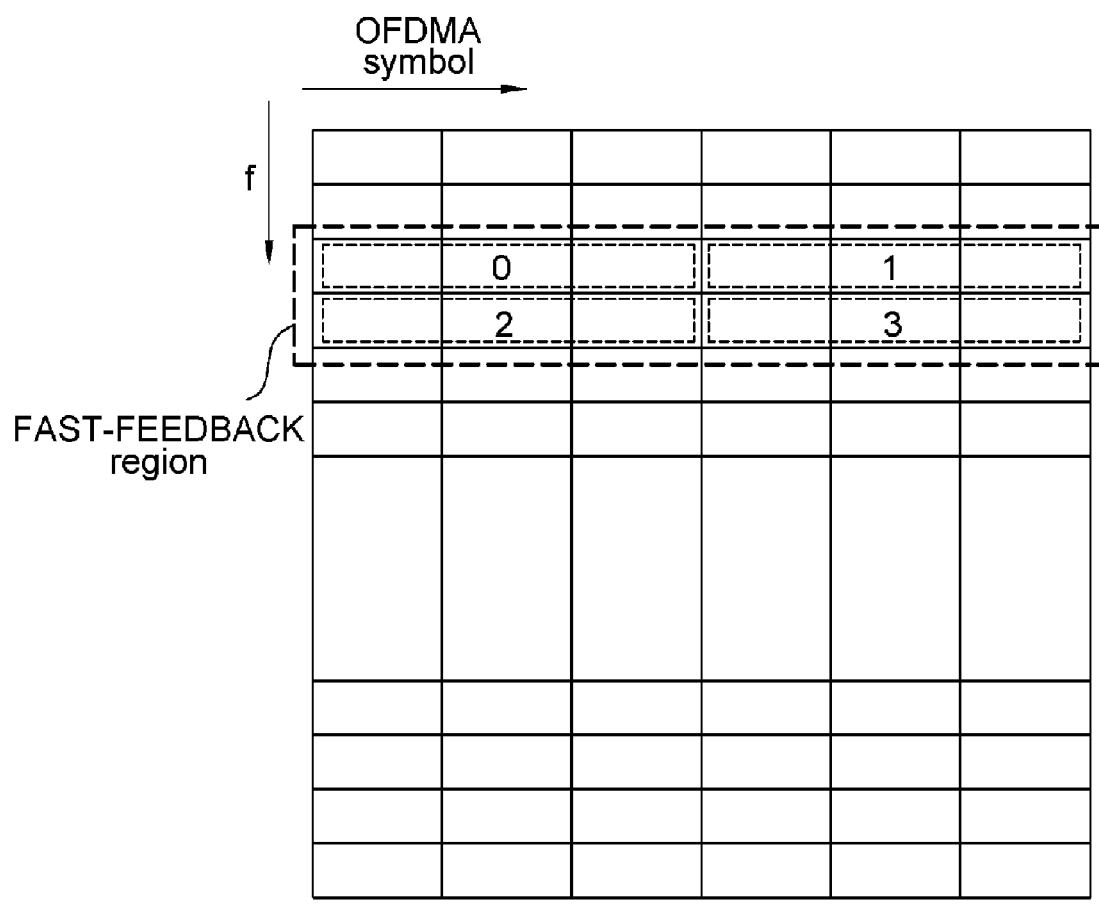
FIG. 3 shows an example of a fast feedback region.

FIG. 3 shows an example of a fast feedback region.

Referring to FIG. 3, a fast feedback message is mapped to a fast feedback region. A single fast feedback message may occupy a single fast feedback slot. Here, it is shown that four fast feedback slots with a size of three OFDMA symbols are allocated to a single fast feedback region. The fast feedback slot may correspond to a single subchannel.

A single subchannel may include a plurality of tiles. For clarification, it is assumed that a single subchannel includes six tiles. If a single tile is configured according to the PUSC permutation, a single subchannel includes 48 data subcarriers and 24 pilot subcarriers. When a single tile is configured according to a selective PUSC permutation, a single subchannel includes 48 data subcarriers and six pilot subcarriers. Six tiles may be distributed to be positioned at the entire band.

A method for transmitting a control signal through the fast feedback region will now be described. It is assumed that 6-bit control signal is transmitted via a single fast feedback slot, namely, a single subchannel. The control signal may be a CQI, an ACK/NACK signal, a PMI (Precoding Matrix Indicator), an RI (Rank Indicator), or the like. The kind of control signal is not restricted.

Table 1 shows modulation symbols carried in eight data subcarriers included in a single tile. The modulation symbols are modulated to a single subcarrier, and eight modulation symbols carried in a single tile forms a single vector. Eight types of vectors are formed and their indexes have values of 0 to 7.

TABLE 1

| Vector index | Data subcarrier modulation per Codeword-Subcarrier(0), Subcarrier(1), . . . Subcarrier(7) |
| --- | --- |
| 0 | P0, P1, P2, P3, P0, P1, P2, P3 |
| 1 | P0, P3, P2, P1, P0, P3, P2, P1 |
| 2 | P0, P0, P1, P1, P2, P2, P3, P3 |
| 3 | P0, P0, P3, P3, P2, P2, P1, P1 |
| 4 | P0, P0, P0, P0, P0, P0, P0, P0 |
| 5 | P0, P2, P0, P2, P0, P2, P0, P2 |
| 6 | P0, P2, P0, P2, P2, P0, P2, P0 |
| 7 | P0, P2, P2, P0, P2, P0, P0, P2 |

Here, modulation symbols constituting each vector are expressed by Equation 1 shown below:

MathFigure 1

$$P0 = \exp\left(j \cdot \frac{\pi}{4}\right)$$
$$P1 = \exp\left(j \cdot \frac{3\pi}{4}\right)$$
$$P2 = \exp\left(-j \cdot \frac{3\pi}{4}\right)$$
$$P3 = \exp\left(-j \cdot \frac{\pi}{4}\right)$$

[Math. 1]

In this case, the vectors having different indexes are orthogonal to each other.

Vectors allocated to a single subchannel with respect to a control signal having a 6-bit payload may be expressed as shown in Table 2.

TABLE 2

| 6-bit Payload (binary) | Fast-feedback vector indices per Tile Tile(0), Tile(1), . . . Tile(5) |
|---|---|
| 000000 | 0, 0, 0, 0, 0, 0 |
| 000001 | 1, 1, 1, 1, 1, 1 |
| 000010 | 2, 2, 2, 2, 2, 2 |
| 000011 | 3, 3, 3, 3, 3, 3 |
| 000100 | 4, 4, 4, 4, 4, 4 |
| 000101 | 5, 5, 5, 5, 5, 5 |
| 000110 | 6, 6, 6, 6, 6, 6 |
| 000111 | 7, 7, 7, 7, 7, 7 |
| 001000 | 2, 4, 3, 6, 7, 5 |
| 001001 | 3, 5, 2, 7, 6, 4 |
| 001010 | 0, 6, 1, 4, 5, 7 |
| 001011 | 1, 7, 0, 5, 4, 6 |
| 001100 | 6, 0, 7, 2, 3, 1 |
| 001101 | 7, 1, 6, 3, 2, 0 |
| 001110 | 4, 2, 5, 0, 1, 3 |
| 001111 | 5, 3, 4, 1, 0, 2 |
| 010000 | 4, 3, 6, 7, 5, 1 |
| 010001 | 5, 2, 7, 6, 4, 0 |
| 010010 | 6, 1, 4, 5, 7, 3 |
| 010011 | 7, 0, 5, 4, 6, 2 |
| 010100 | 0, 7, 2, 3, 1, 5 |
| 010101 | 1, 6, 3, 2, 0, 4 |
| 010110 | 2, 5, 0, 1, 3, 7 |
| 010111 | 3, 4, 1, 0, 2, 6 |
| 011000 | 3, 6, 7, 5, 1, 2 |
| 011001 | 2, 7, 6, 4, 0, 3 |
| 011010 | 1, 4, 5, 7, 3, 0 |
| 011011 | 0, 5, 4, 6, 2, 1 |
| 011100 | 7, 2, 3, 1, 5, 6 |
| 011101 | 6, 3, 2, 0, 4, 7 |
| 011110 | 5, 0, 1, 3, 7, 4 |
| 011111 | 4, 1, 0, 2, 6, 5 |
| 100000 | 6, 7, 5, 1, 2, 4 |
| 100001 | 7, 6, 4, 0, 3, 5 |
| 100010 | 4, 5, 7, 3, 0, 6 |
| 100011 | 5, 4, 6, 2, 1, 7 |
| 100100 | 2, 3, 1, 5, 6, 0 |
| 100101 | 3, 2, 0, 4, 7, 1 |
| 100110 | 0, 1, 3, 7, 4, 2 |
| 100111 | 1, 0, 2, 6, 5, 3 |
| 101000 | 7, 5, 1, 2, 4, 3 |
| 101001 | 6, 4, 0, 3, 5, 2 |
| 101010 | 5, 7, 3, 0, 6, 1 |
| 101011 | 4, 6, 2, 1, 7, 0 |
| 101100 | 3, 1, 5, 6, 0, 7 |
| 101101 | 2, 0, 4, 7, 1, 6 |
| 101110 | 1, 3, 7, 4, 2, 5 |
| 101111 | 0, 2, 6, 5, 3, 4 |
| 110000 | 5, 1, 2, 4, 3, 6 |
| 110001 | 4, 0, 3, 5, 2, 7 |
| 110010 | 7, 3, 0, 6, 1, 4 |
| 110011 | 6, 2, 1, 7, 0, 5 |
| 110100 | 1, 5, 6, 0, 7, 2 |
| 110101 | 0, 4, 7, 1, 6, 3 |
| 110110 | 3, 7, 4, 2, 5, 0 |
| 110111 | 2, 6, 5, 3, 4, 1 |
| 111000 | 1, 2, 4, 3, 6, 7 |
| 111001 | 0, 3, 5, 2, 7, 6 |
| 111010 | 3, 0, 6, 1, 4, 5 |
| 111011 | 2, 1, 7, 0, 5, 4 |
| 111100 | 5, 6, 0, 7, 2, 3 |
| 111101 | 4, 7, 1, 6, 3, 2 |
| 111110 | 7, 4, 2, 5, 0, 1 |
| 111111 | 6, 5, 3, 4, 1, 0 |

Eight modulation symbols carried in a single tile represent a single vector, and six vectors allocated to six tiles represent a single control signal. A control signal mapped to a subchannel and expressed in the form of vector is called a codeword. Table 2 shows an example of combinations of vectors per payload. There is no limitation in the vector combinations and a skilled person in the art would easily modify them.

For example, it is assumed that a UE receives a channel measurement request from a BS and transmits a 6-bit CQI in response thereto. If the value of the CQI is 5, 5 may become '000101' by binary numbers and a vector index in Table 2 is {5,5,5,5,5,5}. The UE modulates the vectors of the index 5 in Table 1 to the respective data subcarriers of six tiles constituting a single subchannel and transmits the same through the fast feedback region. The BS extracts the vectors from the fast feedback region and obtains the vector index. The BS may obtain the corresponding bit expression of '000101' of the CQI reversely from the obtained vector index. A pilot subcarrier included in a tile may carry pilot, a null, or other data symbols.

For another example, it is assumed that the UE receives data from the BS and transmits 1-bit ACK/NACK signal in response thereto. For the single ACK/NACK signal, ½ subchannels, namely, three tiles, may be allocated at the fast feedback region. When payload with respect to the ACK/NACK signal is 1 bit (e.g., 0 in case of ACK and 1 in case of NACK), vectors allocated to the ½ subchannels can be expressed as shown in Table 3.

TABLE 3

| ACK 1-bit symbol | Vector indices per Tile - Tile(0), Tile(1), Tile(2) |
|---|---|
| 0 | 0, 0, 0 |
| 1 | 4, 7, 2 |

Three vectors allocated to the three tiles represent a single ACK/NACK signal. Modulation symbols representing a single vector may be the same as shown in Table 1, and each modulation symbol may be expressed by Equation 1.

When the BS receives the ACK signal in response to the downlink data, it transmits next downlink data. If the BS receives the NACK signal, it transmits retransmission data. The retransmission data may be the same as the original downlink data or may be different according to an HARQ (Hybrid Automatic Repeat Request) scheme. The BS may attempt retransmissions by a predetermined number of times.

The vectors of each index in Table 1 and the vector combinations in Table 2 and 3 are merely examples without being limited. The skilled person in the art may determine differently the number of vector indexes and the size of payload.

The method for transmitting a control signal through the fast feedback region as described above may be applicable when a single control signal is carried on a control channel (to be described).

Transmission of a single control signal (e.g., CQI) or two control signals (e.g., ACK/NACK signal) via a single subchannel leads to a waste of radio resources. For example, if there are ten UEs that transmit a CQI through a single uplink frame and each UE transmits two control signals, 20 subchannels are used within the uplink frame. 210 subchannels may be included in the uplink frame at a frequency band of 10 MHz, and the use of 20 subchannels for the control signals is a waste of radio resources. In addition, if the control signals have k bits and are transmitted on 48 subcarriers according to a QPSK (Quadrature Phase Shift Keying) method, a code rate will be k/96. If k is 6, the control signals are transmitted at a code rate of 1/16, and it is an unnecessary overhead caused as an excessively low code rate is used.

A method for transmitting a plurality of control signals via a single control channel region and the configuration of a control channel region aimed for effectively transmitting control signals will now be described.

Figure 4:
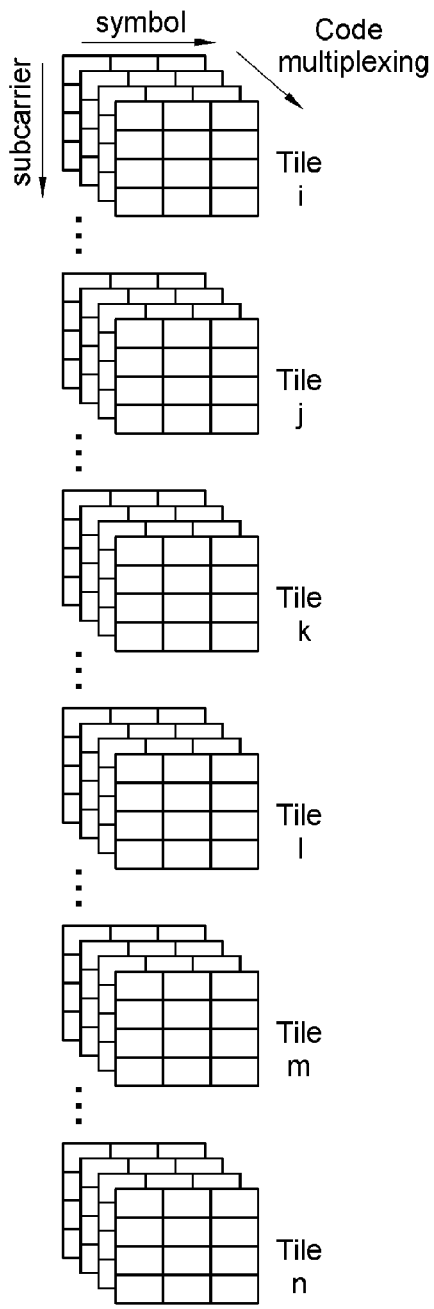
FIG. 4 shows a method for multiplexing control signals according to an embodiment of the present invention.

FIG. 4 shows a method for multiplexing control signals according to an embodiment of the present invention.

Referring to FIG. 4, code multiplexing is applied to multiplex a plurality of control signals into a single control channel region. A plurality of control channels can be multiplexed into a single control channel region by multiplying orthogonal codes to the respective control signals. A control channel refers to a channel transmitting a single control signal, and may be called variably such as a CQI channel, an ACK/NACK channel, or the like, according to types of control signals. The control channel region includes a plurality of tiles. The tiles include a plurality of subcarriers contiguous in a plurality of OFDM symbols. For example, the size of tiles may vary such as time×frequency=3×4, 4×3, 6×4, 6×6, or the like. The number of tiles constituting the control channel region may be changed variably. For example, if six tiles with a size of time×frequency=3×4 forms a single control channel region, the control channel region has the same structure as the subchannel of the uplink frame.

Here, the control channel region is shown to include six tiles (i, j, k, l, m, and n) and each tile includes 3 OFDM symbols in a time domain and four subcarriers in a frequency domain, but the structure of the tiles may be modified variably without being limited. Each tile includes at least one pilot subcarrier and a plurality of data subcarriers. Pilot is allocated to the pilot subcarrier and the pilot may be defined for a coherent detection. The coherent detection is a method for obtaining data carried on a data subcarrier after performing channel estimation using pilot.

A control signal with a spreading code is allocated to each tile of the control channel region. The spreading code discriminates a plurality of control signals allocated to the single control channel region. The spreading code discriminates a plurality of control channel multiplexed into the single control channel region. First, a k-bit control signal is symbol-based coded into the 'p' number of modulation symbols. Alternatively, the k-bit control signal may be bit-based coded and then modulated according to the modulation scheme such as QPSK. The 'p' number of modulation symbols are spread by a spreading code with a length of 'c' into the p×c number of symbols, which are then carried in the control channel region. Each of the p×c number of symbols is carried on the data subcarriers of the respective tiles included in the control channel region. In this case, mutually orthogonal spreading codes are applied to the control signals multiplexed into the single control channel region. A different spreading code is applied to each control channel in the single control channel region. Spreading codes by the number of pilot subcarriers included in the tiles may be used for the single control channel region, and control signals by the number of pilot subcarriers may be multiplexed.

For example, if four control channels are multiplexed into the single control channel region, a k-bit first control signal is coded into twelve modulation symbols, which is generated as 48 symbols by using a spreading code with a length of 4, and then carried on 48 data subcarriers included in the first control channel. A second, third or fourth signal may be also carried on a second, third or fourth control channel in the same manner. In this case, mutually orthogonal spreading codes are applied to each control channel. The orthogonality of the spreading codes may be maintained in a contiguous frequency domain or time domain. With the orthogonality of the spreading codes maintained, a detection performance in case where a plurality of control signals are multiplexed through the single control channel region and transmitted can be the same as that of a case where a single control signal is transmitted.

The spreading code spread the control signal in the time domain or the frequency domain. As the spreading code, an orthogonal code such as a Hadamard code, a DFT sequence, a Walsh code, a Zadoff-Chu (ZC) CAZAC (Constant Amplitude Zero Auto-Correlation) sequence or the like, which are well known, may be used.

The ZC sequence, one of the CAZAC sequences, can be expressed by Equation 2 shown below:

MathFigure 2

$$c(k) = \exp\left\{-\frac{j\pi Mk(k+1)}{N}\right\}, \text{ when } N \text{ is odd number}$$

$$c(k) = \exp\left\{-\frac{j\pi Mk^2}{N}\right\}, \text{ when } N \text{ is even number}$$

[Math. 2]

wherein c(k) is the kth element of the ZC sequence with an index 'M', 'N' is the length of the ZC sequence, the index 'M' is a natural number which is not larger than 'N', and 'M' and 'N' are relatively primes. Each UE may be discriminated by applying ZC sequences each having a different circular shift value. Namely, a plurality of control signals can be discriminated by each different circular shift value. The number of available circular shifts may differ according to a delay spread of channels. This is merely an example, and other sequences with good correlation characteristics may be applicable.

Figure 5:
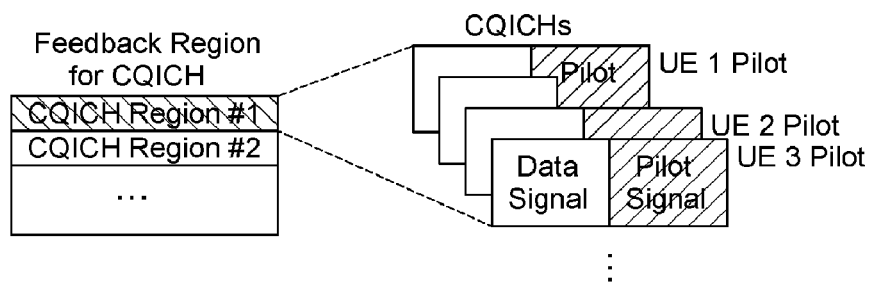
FIG. 5 shows an example of allocation of a control channel region to a plurality of UEs.

FIG. 5 shows an example of allocation of the control channel region to a plurality of UEs. In the following description, it is assumed that the control channel region is a fast feedback region for a CQICH.

Referring to FIG. 5, the fast feedback region for the CQI channel includes a plurality of CQI channel regions. A single subchannel, namely, six tiles, may be allocated to a single CQI channel region. A plurality of CQI channels may be multiplexed into the single CQI channel region according to code multiplexing. A particular orthogonal code-applied control signal and pilot signal are transmitted via each CQI channel. The control signal is allocated to a data subcarrier and the pilot signal is allocated to a pilot subcarrier, which are then transmitted.

The CQI channels in the single CQI channel region may be allocated to a plurality of UEs. In this case, a single CQI channel may be allocated to a single UE, or a plurality of CQI channels may be allocated to the single UE. If the CQI channels in the single CQI channel region are allocated to different UEs, each UE applies a code index given to each UE to the control signal and the pilot signal and transmits them via each CQI channel.

If a plurality of CQI channels are allocated to a single UE in the same CQI channel region, the UE applies a code index which has been allocated for each CQI channel to each control signal of each CQI channel and transmits the same. The UE does not transmit all the pilot signals of the plurality of CQI channels but applies a corresponding code index to a pilot signal of one of the plurality of CQI channels and transmits the same. The pilot signal is for channel estimation, and because control signals transmitted via the same CQI channel region from a single UE have the same channel state, so there is no need to repeatedly transmit a plurality of pilots.

For example, it is assumed that when a CQI channel region #1 is allocated to three UEs, two CQI channels are allocated to the first UE (UE 1) while one CQI channel is allocated to the second and third UEs (UE 2 and UE 3). When the BS allocates the CQI channels to the UEs, it may assigns a code index indicating a particular orthogonal code to be applied to the respective CQI channels to the UEs. The first UE (UE 1) spreads the two data signals by using its code index and transmits the same, and spreads only one of the two pilot signals by using its code index and transmits the same. Because the BS knows the code indexes assigned to the UEs, it can estimate a channel state from the pilot signals. And, the BS can decode the two data signals transmitted by the first UE (UE 1) based on the estimated channel. The second and third UEs (UE 2 and UE 3) apply a code index assigned to them to the data signals and the pilot signals and transmit them. The data signals transmitted by the second and third UEs are decoded based on channels estimated through the pilot signals of their own.

When the plurality of CQI channels of the same CQI channel region are allocated to a single UE, the code index is applied only to a single pilot signal and transmitted, to thereby reduce an interference possibly caused by an unnecessary signal transmission. Meanwhile, a CQI channel through which pilot is not transmitted among the plurality of CQI channels may transmit a different control signal by using pilot subcarrier. For example, when an ACK/NACK signal is intended to be transmitted together with a CQI, the CQI may be carried in the data subcarrier of the CQI channel and transmitted, and the ACK/NACK signal may be carried in the pilot subcarrier and then transmitted. Besides, the pilot subcarriers that are not in use in the plurality of CQI channels of the same CQI channel region allocated to the single UE can be utilized to transmit various control signals with a size of small bits such as a radio resource allocation request or the like.

The configuration of the control channel region will now be described. It is assumed that a plurality of control channels can be multiplexed to a single control channel region according to the above-described code multiplexing scheme.

<Disposition of Tiles Constituting a Single Control Channel Region>

Figure 6:
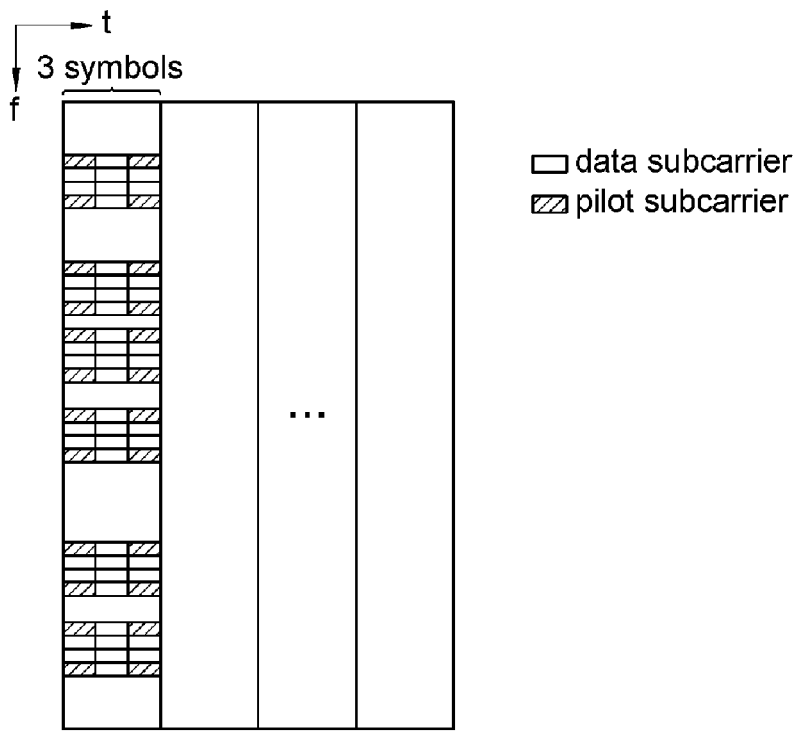
FIG. 6 shows one example of disposition of tiles constituting a single control channel region.

FIG. 6 shows an example of disposition of tiles constituting a single control channel region.

Referring to FIG. 6, it is assumed that a single tile includes four subcarriers continuing in the frequency region in the three OFDM symbols in the time domain, and six tiles constitute a single control channel region. A single tile includes eight data subcarriers and four pilot subcarriers. The four pilot subcarriers are positioned at corners of the tile.

If a basic range with respect to the single control channel region is 3 OFDM symbols, the respective tiles may be distributedly (dispersedly or separately) or contiguously disposed in the frequency domain. The basic range with respect to the control channel region refers to a range within which the plurality of tiles included in the control channel region can be distributed in the time domain. The basic range with respect to the control channel region may extend by multiples of the three OFDM symbols according to configuration of the tiles. If the tiles have a size of six OFDM symbols at the time domain, the basic range with respect to the control channel region can extend by multiples of the six OFDM symbols.

Figure 7:
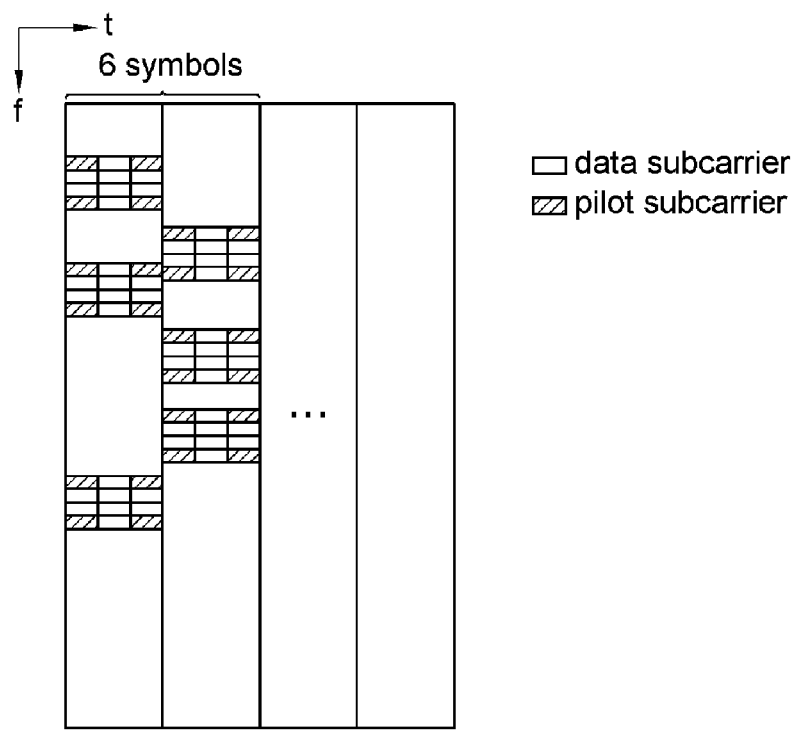
FIG. 7 shows another example of disposition of tiles constituting a single control channel region.

FIG. 7 shows another example of disposition of tiles constituting a single control channel region.

Referring to FIG. 7, a basic range with respect to a single control channel region is six OFDM symbols on the same assumption as that of the case shown in FIG. 6. Tiles are distributedly or contiguously disposed in the frequency domain or time domain. Of the six tiles, three are disposed at the front three OFDM symbols while the other three are disposed at the rear three OFDM symbols. The positions of the three tiles disposed at the front three OFDM symbols and the positions of the three tiles disposed at the rear three OFDM symbols may be the same or different in the frequency domain.

Figure 8:
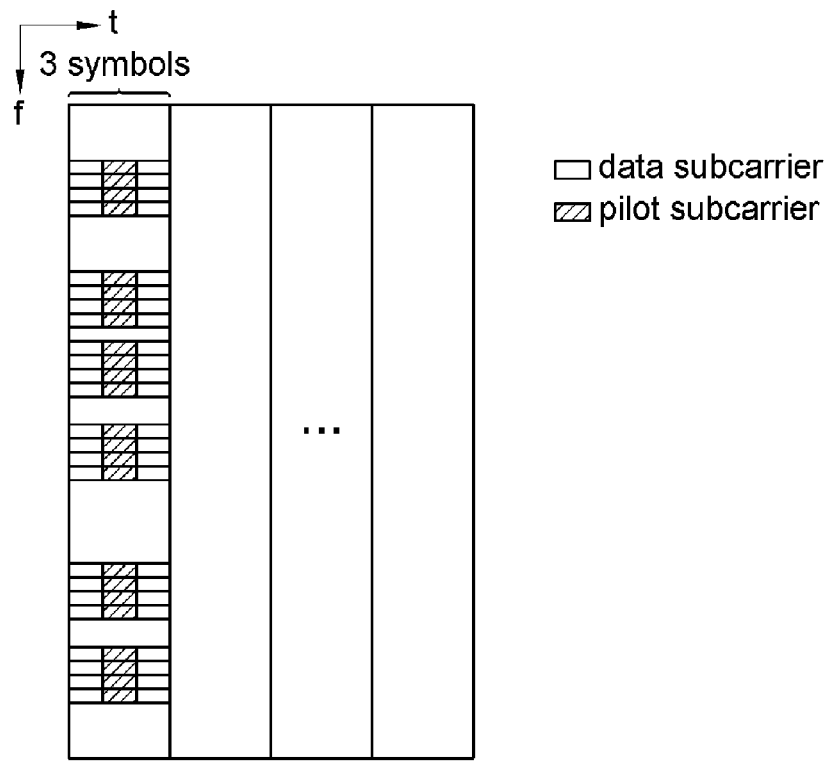
FIG. 8 shows a disposition of tiles constituting a single control channel region according to one embodiment of the present invention.

FIG. 8 shows a disposition of tiles constituting a single control channel region according to an embodiment of the present invention.

Referring to FIG. 8, it is assumed that one tile includes four subcarriers continuous in the frequency domain in three OFDM symbols in the time domain, and six tiles constitute a single control channel region. A single tile includes eight data subcarriers and four pilot subcarriers. The four pilot subcarriers may be allocated to be contiguous in the frequency domain in the single OFDM symbol to conveniently multiplex control signals.

When a basic range with respect to the single control channel region is the three OFDM symbols, the respective tiles may be distributedly or contiguously disposed in the frequency domain.

Figure 9:
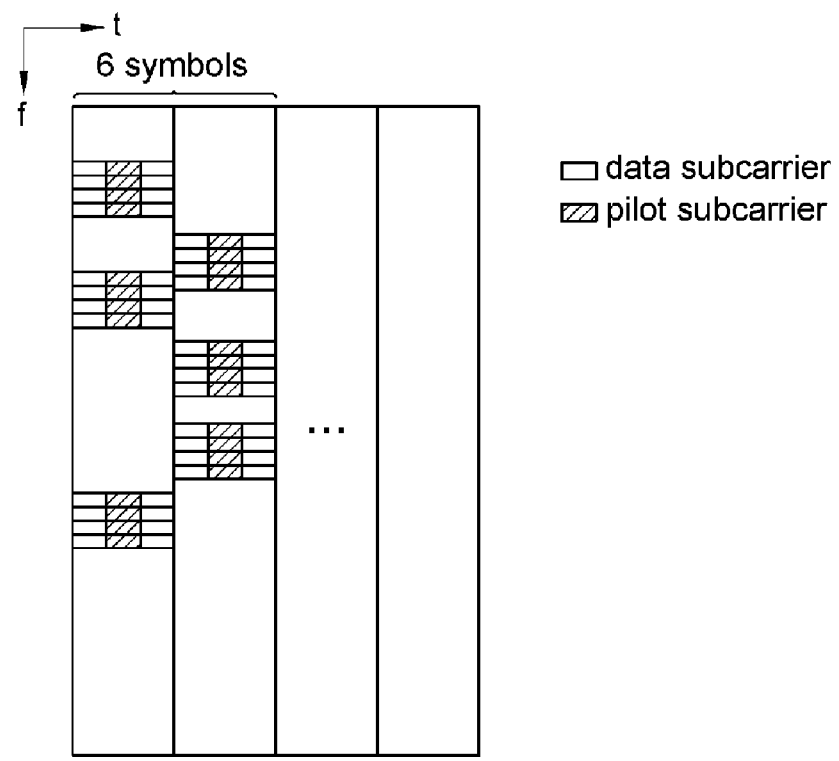
FIG. 9 shows a disposition of tiles constituting a single control channel region according to another embodiment of the present invention.

FIG. 9 shows a disposition of tiles constituting a single control channel region according to another embodiment of the present invention.

Referring to FIG. 9, a basic range with respect to a single control channel region is six OFDM symbols on the same assumption as that of the case shown in FIG. 8. Tiles are distributedly or contiguously disposed in the frequency domain or time domain. Of the six tiles, three are disposed at the front three OFDM symbols while the other three are disposed at the rear three OFDM symbols. The positions of the three tiles disposed at the front three OFDM symbols and the positions of the three tiles disposed at the rear three OFDM symbols may be the same or different in the frequency domain.

The configuration of tiles is merely an example and may be modified variably. The size of the tiles may be changed variably such as time×frequency=4×3, 3×3, 6×4, 6×6, or the like, and accordingly, the number of data subcarriers and pilot subcarriers included in the tiles may differ. The number of tiles constituting the single control channel region may also be changed. Although the number of tiles constituting the single control channel varies or although the configuration of the tiles varies, the basic range of the control channel region may be determined by multiples of the OFDM symbols constituting the tiles. The plurality of tiles may be distributedly or contiguously disposed within the basic range of the control channel region. The basic region with respect to the control channel region may be previously determined or transmitted to the UE via a DL-MAP, an FCH, or a broadcast channel.

Figure 10:
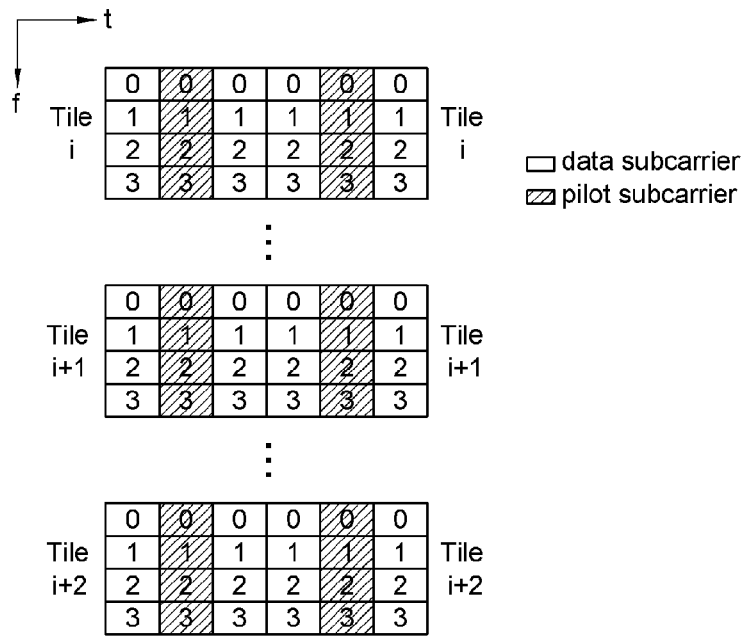
FIG. 10 shows control channel regions according to a disposition of tiles in six OFDM symbols according to one embodiment of the present invention.

FIG. 10 shows control channel regions according to a disposition of tiles in six OFDM symbols according to an embodiment of the present invention.

Referring to FIG. 10, it is assumed that a single tile includes four subcarriers continuous in the frequency domain in three OFDM symbols in the time domain. Three tiles (i, i+1, and i+2) may be disposed at the front three OFDM symbols among the six OFDM symbols, and another three tiles (i, i+1, and i+2) may be disposed at the rear three OFDM symbols. The three tiles disposed at the front three OFDM symbols and the three tiles disposed at the rear three OFDM symbols are distributed in the same manner in the frequency domain. In this case, a basic range of the control channel region is three OFDM symbols. Such control channel region may be allocated to a control signal transmitted by using three tiles such as the ACK/NACK signal.

Figure 11:
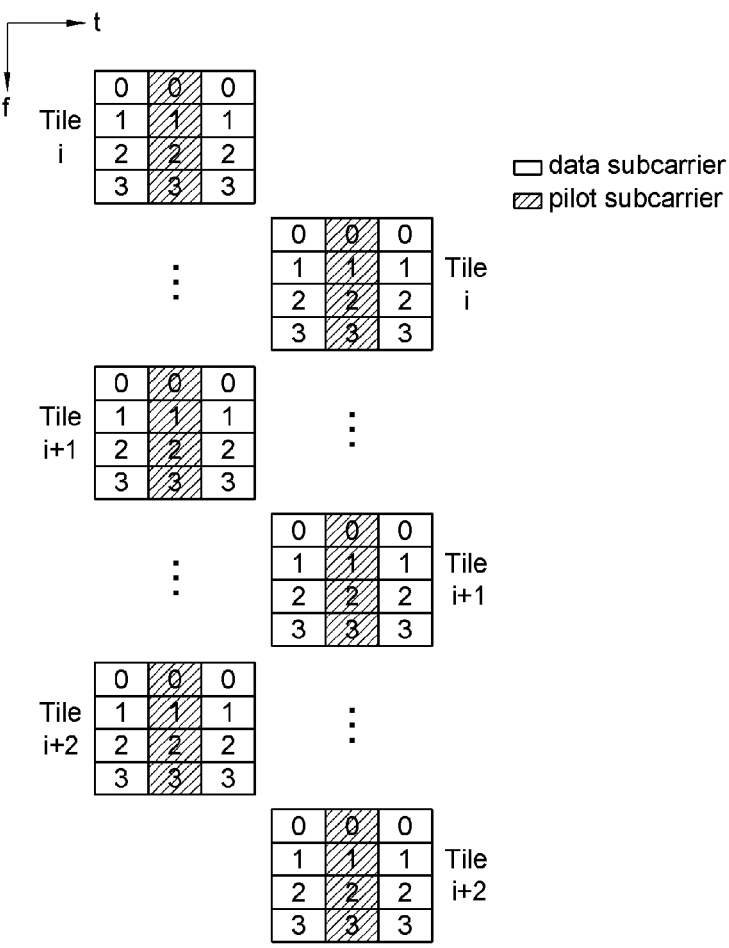
FIG. 11 shows control channel regions according to a disposition of tiles in six OFDM symbols according to another embodiment of the present invention.

FIG. 11 shows control channel regions according to a disposition of tiles in six OFDM symbols according to another embodiment of the present invention.

Referring to FIG. 11, it is assumed that a single tile includes four subcarriers continuous in the frequency domain in three OFDM symbols in the time domain. Three tiles (i, i+1, and i+2) may be disposed at the front three OFDM symbols among the six OFDM symbols, and another three tiles (i, i+1, and i+2) may be disposed at the rear three OFDM symbols. The three tiles disposed at the front three OFDM symbols and the three tiles disposed at the rear three OFDM symbols are distributed in different manners in the frequency domain. The three tiles disposed at the front three OFDM symbols and the three tiles disposed at the rear three OFDM symbols may be disposed crisscross in the frequency domain. In this case, a basic range of a control channel region is three OFDM symbols, and such control channel region may be allocated to a control signal transmitted by using three tiles.

Figure 12:
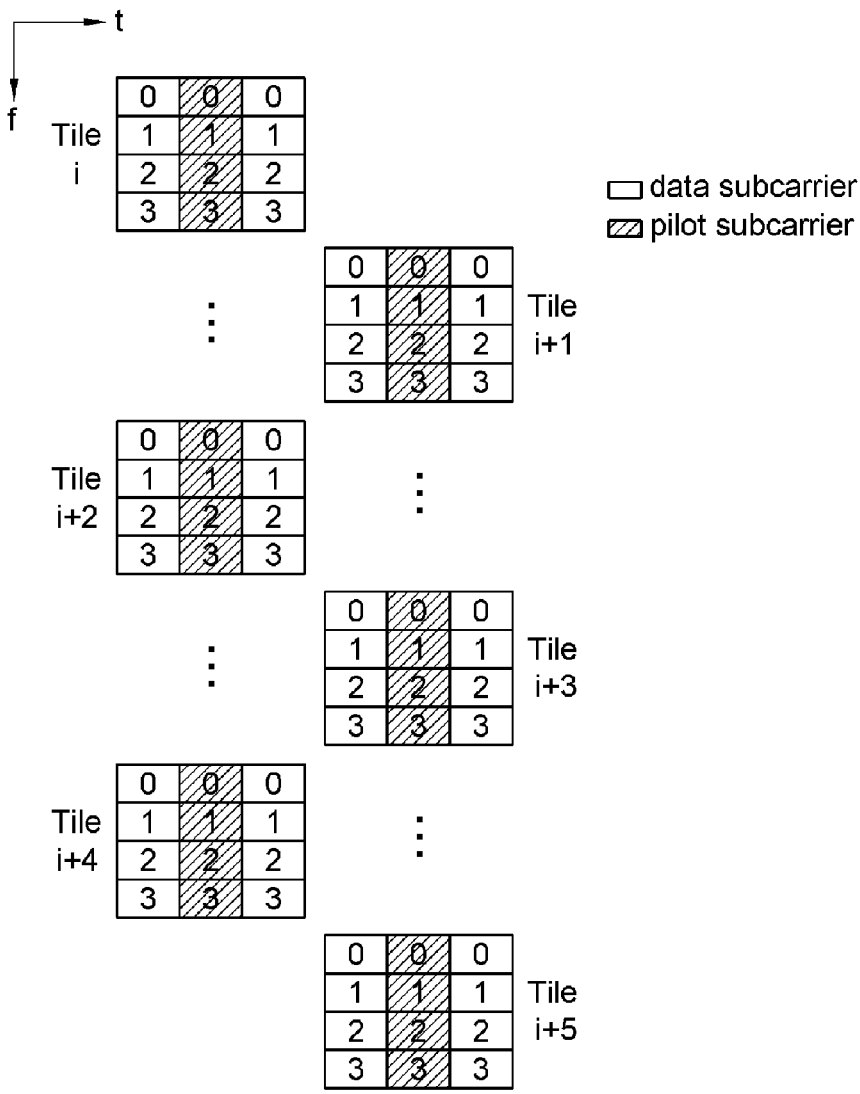
FIG. 12 shows control channel regions according to a disposition of tiles in six OFDM symbols according to still another embodiment of the present invention.

FIG. 12 shows control channel regions according to a disposition of tiles in six OFDM symbols according to still another embodiment of the present invention.

Referring to FIG. 12, it is assumed that a single tile includes four subcarriers continuous in the frequency domain in three OFDM symbols in the time domain. Six tiles (i, i+1, i+2, i+3, i+4, and i+5) are alternately disposed at the front three OFDM symbols and the rear three OFDM symbols. The first, third, and fifth tiles (i, i+2, and i+4) may be disposed at the front three OFDM symbols, and the second, fourth, and sixth tiles (i+1, i+3, and i+5) may be disposed at the rear three OFDM symbols. Alternatively, the first, third, and fifth tiles (i, i+2, and i+4) may be disposed at the rear three OFDM symbols, and the second, fourth, and sixth tiles (i+1, i+3, and i+5) may be disposed at the front three OFDM symbols. A basic range of a control channel region is six OFDM symbols. Such control channel region may be allocated to a control signal transmitted by using the six tiles such as the CQI.

A method for disposing a plurality of control channel regions in the uplink frame will now be described. Without a limitation in the structure of tiles, a plurality of tiles included in the control channel regions are distributedly or contiguously disposed within the basic range of the control channel regions.

<Contiguous Disposition of Tiles in the Plurality of Control Channel Regions>

Figure 13:
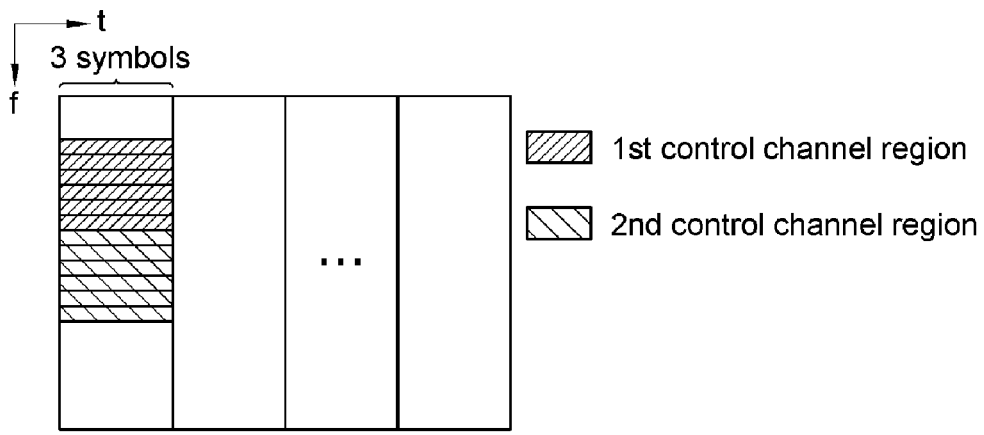
FIG. 13 shows a disposition of tiles in a plurality of control channel regions according to an embodiment of the present invention.

FIG. 13 shows a disposition of tiles in a plurality of control channel regions according to an embodiment of the present invention.

Referring to FIG. 13, it is assumed that a single control channel region includes six tiles, which have a size of three OFDM symbols in the time domain, and there is no limitation in the frequency domain.

The six tiles are disposed to be contiguous in the frequency domain. The tiles included in the first control channel regions are contiguous in the frequency domain, and the tiles included in the second control channel regions are also contiguous in the frequency domain. The first and second control channel regions may be contiguous or not in the frequency domain.

Figure 14:
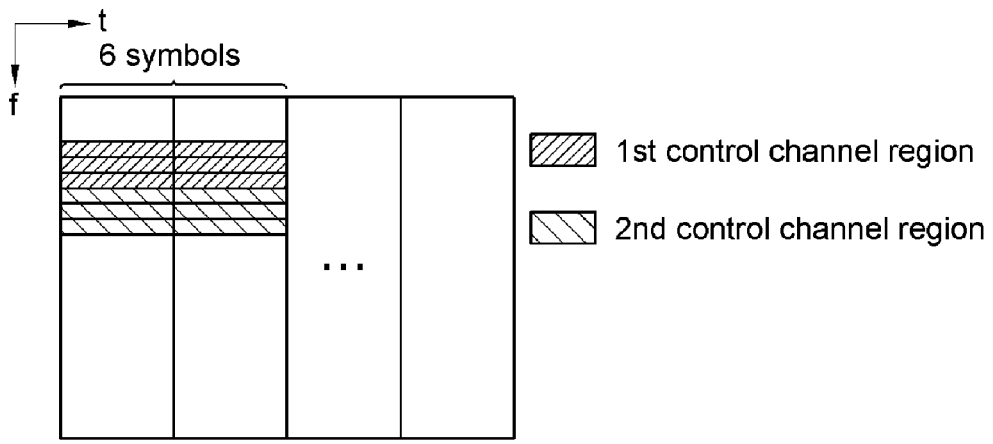
FIG. 14 shows a disposition of tiles in a plurality of control channel regions according to another embodiment of the present invention.

FIG. 14 shows a disposition of tiles in a plurality of control channel regions according to another embodiment of the present invention.

Referring to FIG. 14, a basic range of control channel regions is six OFDM symbols on the same assumption as that of the case shown in FIG. 13. Three tiles are contiguously disposed in the front three OFDM symbols in the frequency domain, and the remaining other three tiles are contiguously disposed at the rear three OFDM symbols. In this case, the three tiles of the front three OFDM symbols and the three tiles of the rear three OFDM symbols are contiguous in the same frequency band in the time domain. First control channel regions and second control channel regions may be contiguous or may not be contiguous in the frequency domain.

Figure 15:
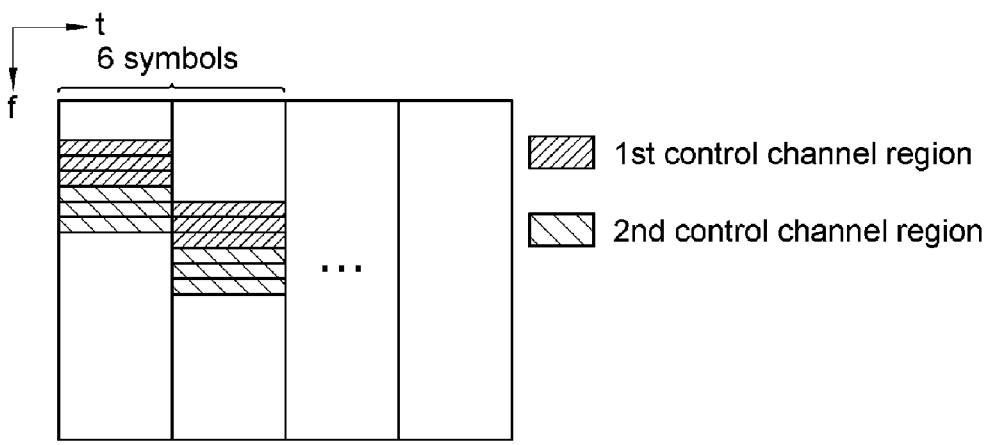
FIG. 15 shows a disposition of tiles in a plurality of control channel regions according to still another embodiment of the present invention.

FIG. 15 shows a disposition of tiles in a plurality of control channel regions according to still another embodiment of the present invention.

Referring to FIG. 15, three tiles are contiguously disposed at the front three OFDM symbols in the frequency domain, and the other remaining three tiles are contiguously disposed in the frequency domain at the rear three OFDM symbols, and in this case, the three tiles of the front three OFDM symbols and the three tiles of the rear three OFDM symbols are disposed at different frequency bands.

The cases where the basic ranges of the control channel regions are three or six OFDM symbols have been described, but they are merely examples without being limited thereto. There is no limitation in the number of tiles included in the control channel regions, the size of the tiles in the time domain, and the basic range of the control channel regions. The control channel regions in which the tiles are contiguously disposed in the frequency domain can be used to allocate a particular frequency band with a good channel state to the UEs in the CQI-based radio resource scheduling.

<Distributed Disposition of Tiles in a Plurality of Control Channel Regions>

Figure 16:
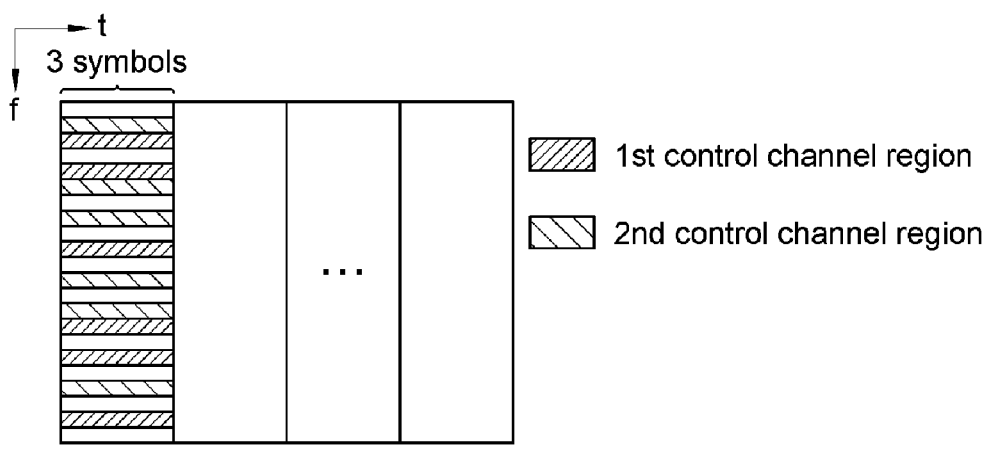
FIG. 16 shows a disposition of tiles in a plurality of control channel regions according to still another embodiment of the present invention.

FIG. 16 shows a disposition of tiles in a plurality of control channel regions according to still another embodiment of the present invention.

Referring to FIG. 16, it is assumed that a single control channel region includes six tiles, which have a size of three OFDM symbols in the time domain, and there is no limitation in the frequency domain.

When a basic range of the control channel region is the three OFDM symbols, six tiles are distributedly disposed in the frequency domain. The tiles may be regularly disposed at certain intervals or irregularly disposed in the frequency domain. The tiles included in the first control channel regions and tiles included in the second control channel regions are disposed to be mixed in the overall frequency band. The tiles included in the first control channel regions and the tiles included in the second control channel regions may be distributed according to each different rule. The tiles included in the first control channel regions and the tiles included in the second control channel regions may be contiguous to each other in the frequency domain.

Figure 17:
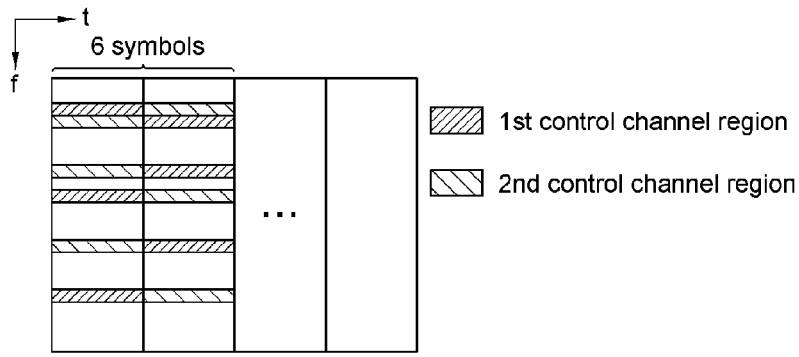
FIG. 17 shows a disposition of tiles in a plurality of control channel regions according to still another embodiment of the present invention.

FIG. 17 shows a disposition of tiles in a plurality of control channel regions according to still another embodiment of the present invention.

Referring to FIG. 17, a basic range of control channel regions is six OFDM symbols on the same assumption as that of the case shown in FIG. 16. Three tiles are distributedly disposed at the front three OFDM symbols in the frequency domain, and the remaining other three tiles are distributedly disposed at the rear three OFDM symbols. In this case, the three tiles of the front three OFDM symbols and the three tiles of the rear three OFDM symbols are may be distributed according to each different rule. The tiles included in the first control channel regions and the tiles included in the second control channel regions may be distributed according to each different rule.

Figure 18:
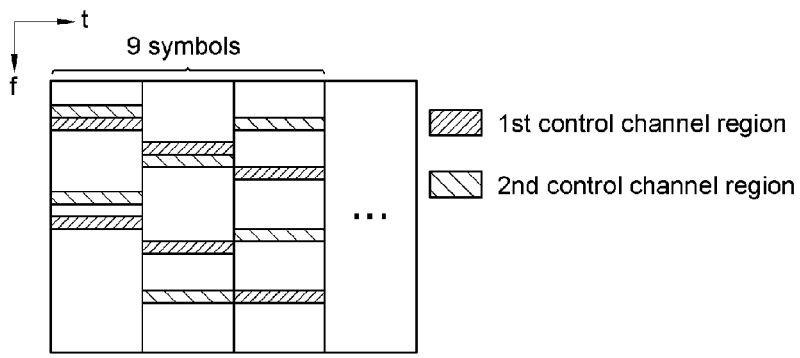
FIG. 18 shows a disposition of tiles in a plurality of control channel regions according to still another embodiment of the present invention.

FIG. 18 shows a disposition of tiles in a plurality of control channel regions according to still another embodiment of the present invention.

Referring to FIG. 18, a basic range of control channel regions is nine OFDM symbols on the same assumption as that of the case shown in FIG. 16. Two tiles are distributedly disposed at the first three OFDM symbols in the frequency domain, and two different tiles are distributedly disposed at the second three OFDM symbols in the frequency domain, and two other remaining tiles are distributedly disposed at the third three OFDM symbols in the frequency domain. In this case, the first three OFDM symbols, the second three OFDM symbols, and the third three OFDM symbols may be distributed according to each different rule. Tiles included in first control channel regions and tiles included in second control channel regions may be distributed according to each different rule.

The control channel regions in which the tiles are distributedly disposed in the frequency domain may be used to obtain a frequency diversity gain with respect to a control signal with a small size when a channel state is not known or when there is no frequency band with a particularly good channel state.

The cases where the basic range of the control channel regions is three, six or nine OFDM symbols when the tiles have the size of three OFDM symbols in the time domain have been described, but they are merely examples without being limited thereto. There is no limitation in the number of tiles included in the control channel regions, the size of the tiles in the time domain, and the basic range of the control channel regions.

<Disposition of Tiles in a Plurality of Control Channel Regions Using Allocation Blocks>

Figure 19:
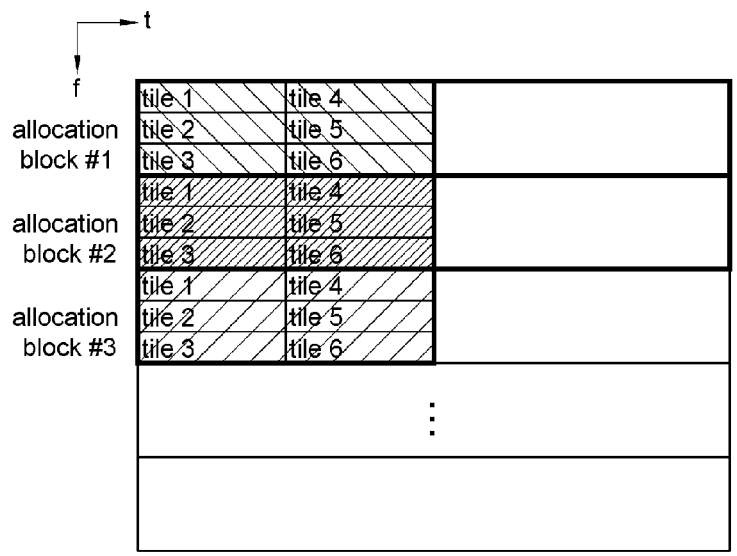
FIG. 19 shows a disposition of tiles of a plurality of control channel regions using allocation blocks according to one embodiment of the present invention.

FIG. 19 shows a disposition of tiles of a plurality of control channel regions using allocation blocks according to one embodiment of the present invention.

Referring to FIG. 19, an allocation block is a minimum unit allocated to the UE in a physical resource domain. The allocation block includes a plurality of tiles contiguous in the time domain or the frequency domain. When a control channel region includes the 'm' number of tiles, the allocation bloc may be determined to include the m×k number of tiles (m, k≧1, integers). Namely, the size of the allocation block may be determined to be the same as that of the control channel region or a multiple of the size of the control channel region.

If the size of the allocation block and that of the control channel region are the same, tiles included in the single control channel region can be all disposed in the single allocation block. For example, it is assumed that the allocation block includes six tiles, of which two are contiguous in the time domain and three are contiguous in the frequency domain, and three allocation blocks are allocated to a UE. In this case, the six tiles included in the first control regions may be all disposed at a first allocation block, the six tiles included in the second control channel regions may be all disposed at a second allocation block, and the six tiles included in the third control channel regions may be all disposed at a third allocation block. Here, the three allocation blocks allocated to the UE are shown to be contiguous, but the plurality of allocation blocks allocated to the UE may be distributed (dispersed, separated), rather than being contiguous. Disposition of all the tiles of the single control channel region in the single allocation block may be contiguous disposition of the tiles, but the plurality of allocation blocks allocated to the UE may be distributed to the frequency domain to obtain a frequency diversity gain.

Figure 20:
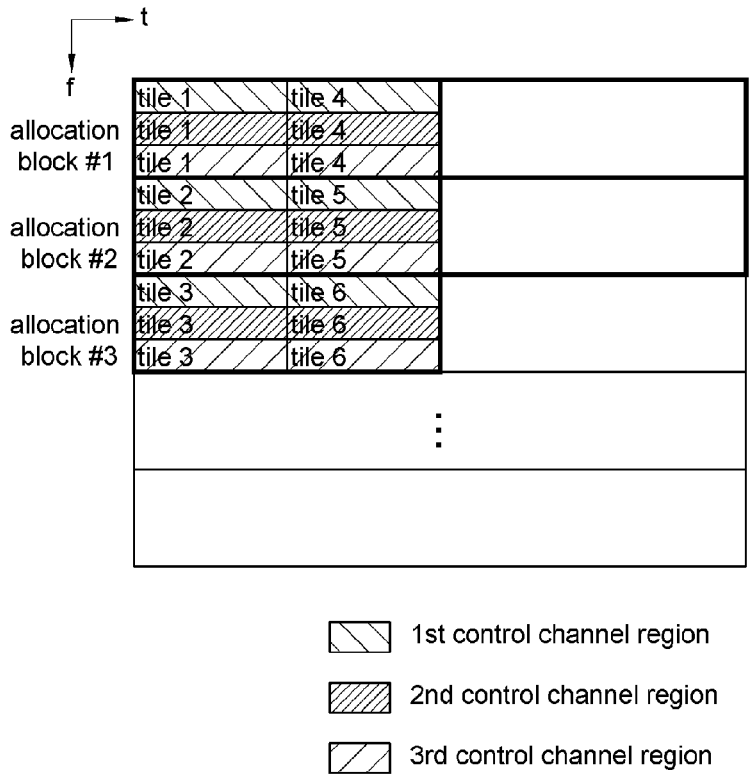
FIG. 20 shows a disposition of tiles of a plurality of control channel regions using allocation blocks according to another embodiment of the present invention.

FIG. 20 shows a disposition of tiles of a plurality of control channel regions using allocation blocks according to another embodiment of the present invention.

Referring to FIG. 20, if the size of an allocation block and that of a control channel region are the same, tiles included in a single control channel region may be distributedly disposed in a plurality of allocation blocks. For example, it is assumed that an allocation block includes six tiles, two of the tiles being contiguous in the time domain and three of the tiles being continuous in the frequency domain, and three allocation blocks are allocated to the UE. Of the six tiles included in a first control channel region, two tiles (tiles 1 and 4) may be disposed at a first allocation block, two other tiles (tiles 2 and 5) may be disposed at a second allocation block, and the remaining two tiles (tiles 3 and 6) may be disposed at a third allocation block. Tiles included in second and third control channel regions may be also distributedly disposed in the three allocation blocks in the same manner. The plurality of allocation blocks allocated to the UE may be contiguous or distributed in the frequency domain.

The method of disposing all the tiles of a single control channel in a single allocation block may be used for a control signal that requires several allocation blocks because of a large size data, while the method of distributedly disposing tiles of a control channel region in a plurality of allocation blocks may be used for a control signal that can be transmitted with a single allocation block because the size of data is relatively small. For the control signal that requires several allocation blocks, an allocation block distributed in the frequency domain may be allocated to thereby obtain a frequency diversity gain, and for the control signal that is transmitted with a single allocation block, tiles may be distributed to a plurality of allocation blocks to obtain a frequency diversity gain.

<Example of Transmission of Control Signal Via Control Channel Region>

A plurality of control signals may be carried in a single control channel region by using a spreading code so as to be transmitted. The control channel region carrying the plurality of control signals includes a plurality of tiles with various configurations, and the tiles may be distributedly or contiguously disposed in various manners. Information about the dispersed or contiguous disposition of tiles, information about allocation blocks, or the like, may be transmitted to the UE via a DL-MAP, an FCH, a broadcast channel, or the like.

Figure 21:
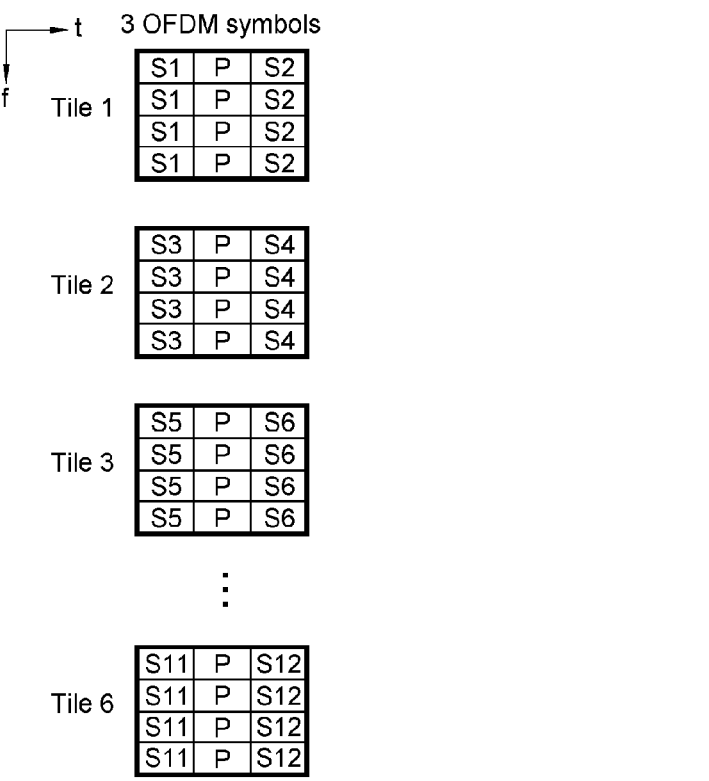
FIG. 21 shows a method of carrying a control signal on a control channel region according to an embodiment of the present invention.

FIG. 21 shows a method of carrying a control signal on a control channel region according to an embodiment of the present invention.

Referring to FIG. 21, it is assumed that a single control channel region includes six tiles including four subcarriers continuous in the frequency domain on three OFDM symbols in the time domain. A single tile includes eight data subcarriers and four pilot subcarriers, and the pilot subcarriers are allocated to the middle OFDM symbols. The control channel region includes 48 data subcarriers and 24 pilot subcarriers.

When a basic range of the control channel region is the three symbols and the six tiles of the control channel region are contiguously or distributedly disposed in the frequency domain, a control signal is coded into twelve modulation symbols (S1, . . . , S12), spread by a spreading code with a length of 4, and then carried on the data subcarriers of each tile. The pilot (P) is spread by a spreading code with a length of 4 used for the control signal and carried on the pilot subcarriers of each tile.

FIG. 22 shows a method of carrying a control signal on a control channel region according to another embodiment of the present invention.

Referring to FIG. 22, a basic range of a control channel region is six OFDM symbols on the same assumption as that of the case shown in FIG. 21, and tiles of two control channel regions are alternately distributed in the frequency domain. Twelve coded modulation symbols (S1, . . . , S12) of a first control signal are spread by a spreading code with a length of 4 and then carried on 48 data subcarriers of a first control channel region. Twelve coded modulation symbols (X1, . . . , X12) of a second control signal are spread by a spreading code with a length of 4 and then carried on 48 data subcarriers of a second control channel region.

FIG. 23 shows a method of carrying a control signal on a control channel region according to still another embodiment of the present invention.

Referring to FIG. 23, a basic range of a control channel region is nine OFDM symbols on the same assumption as that of the case shown in FIG. 21, and tiles of three control channel regions are alternately distributed in the frequency domain. Twelve coded modulation symbols (S1, . . . , S12) of a first control signal are spread by a spreading code with a length of 4 and then carried on 48 data subcarriers of a first control channel region. Twelve coded modulation symbols (X1, . . . , X12) of a second control signal are spread by a spreading code with a length of 4 and then carried on 48 data subcarriers of a second control channel region. Twelve coded modulation symbols (Y1, . . . , Y12) of a third control signal are spread by a spreading code with a length of 4 and then carried on 48 data subcarriers of a third control channel region.

Figure 24:
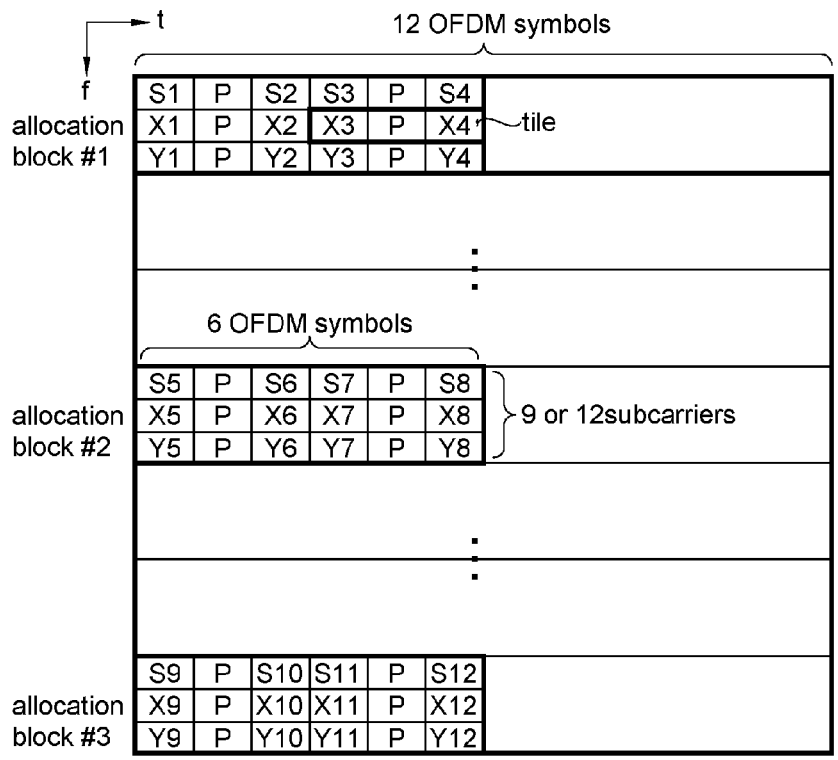
FIG. 24 shows a method of carrying a control signal on a control channel region according to still another embodiment of the present invention.

FIG. 24 shows a method of carrying a control signal on a control channel region according to still another embodiment of the present invention.

Referring to FIG. 24, it is assumed that allocation blocks include six tiles, two of the six tiles being contiguous in the time domain and three of the six tiles being contiguous in the frequency domain. If the tiles have a size of three OFDM symbols in the time domain, the allocation blocks have a size of six OFDM symbols in the time domain. If the tiles have a size of three or four subcarriers in the frequency domain, the allocation blocks have a size of nine or twelve subcarriers in the frequency domain. The size of the tiles may be expressed by time×frequency=3×(size of allocation block/3).

Tiles included in a plurality of control channel regions are distributedly disposed at the allocation blocks distributed in the frequency domain. In this case, the tiles included in the plurality of control channel regions may be distributedly disposed at the allocation blocks on the same OFDM symbols. For example, if tiles included in three control channel regions are distributedly disposed at the three allocation blocks #1, #2, and #3 distributed in the frequency domain on the first six OFDM symbols, twelve coded modulation symbols (S1, . . . , S12) of a first control signal, twelve coded modulation symbols (X1, . . . , X12) of a second control signal, and twelve coded modulation symbols (Y1, . . . , Y12) of a third control signal may be carried on the distributed tiles of the respective control channel regions.

Figure 25:
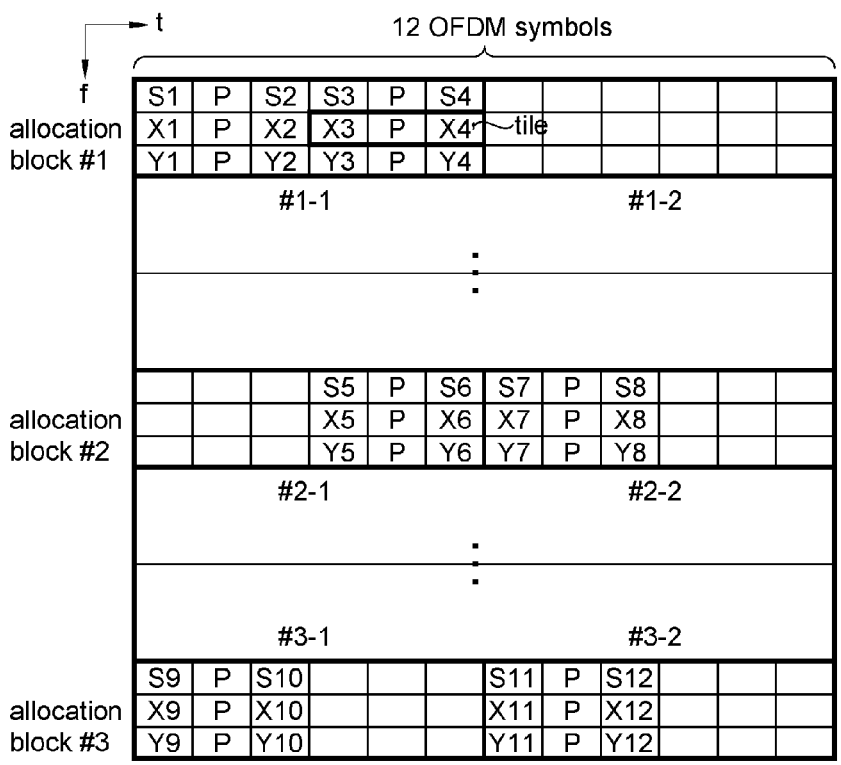
FIG. 25 shows a method of carrying a control signal on a control channel region according to still another embodiment of the present invention.

FIG. 25 shows a method of carrying a control signal on a control channel region according to still another embodiment of the present invention.

Referring to FIG. 25, tiles have a size of three OFDM symbols in the time domain, and allocation blocks have a size of six OFDM symbols in the time domain and have a size of three tiles in the frequency domain.

When tiles included in a plurality of control channel regions are distributedly disposed at the allocation blocks distributed in the frequency domain, the tiles may be distributedly disposed to an allocation block on different OFDM symbols in the time domain. For example, two tiles of the control channel region are disposed at the allocation block #1 on the first six OFDM symbols, the next two tiles are shifted by the three OFDM symbols and disposed one by one at the two allocation blocks (#2-1, #2-2) such that they are contiguous in the time domain, and the remaining two tiles are distributed in the time domain and disposed one by one at the two allocation blocks (#3-1, #3-2). Twelve coded modulation symbols (S1, . . . , S12) of a first control signal, twelve coded modulation symbols (X1, . . . , X12) of a second control signal, and twelve coded modulation symbols (Y1, . . . , Y12) of a third control signal are carried on the distributed tiles of the respective control channel regions.

Figure 26:
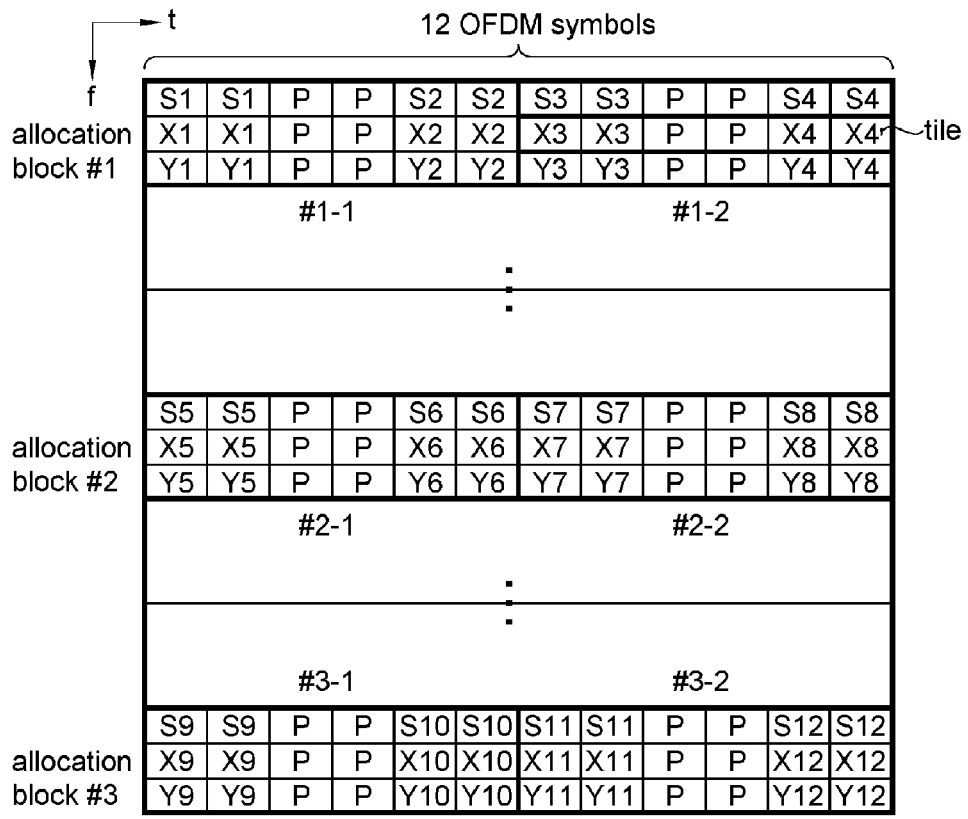
FIG. 26 shows a method of carrying a control signal on a control channel region according to still another embodiment of the present invention.

FIG. 26 shows a method of carrying a control signal on a control channel region according to a different embodiment of the present invention.

Referring to FIG. 26, tiles have a size of six OFDM symbols in the time domain and allocation blocks have a size of six OFDM symbols in the time domain and have a size of three tiles in the frequency domain. In the tiles, data subcarriers are allocated to four OFDM symbols, and pilot subcarriers are allocated to the middle two OFDM symbols.

A single control channel region includes six tiles, and tiles included in three control channel regions are distributedly disposed at six allocation blocks. Within the range of 12 OFDM symbols, two allocation blocks may be contiguous in the time domain and distributed in the frequency domain. Alternatively, six allocation blocks may be distributed in the time domain and in the frequency domain. The six tiles included in the control channel region are distributedly disposed at six allocation blocks. Tiles included in the three control channel regions are disposed one by one at a single allocation block. Twelve coded modulation symbols (S1, . . . , S12) of a first control signal, twelve coded modulation symbols (X1, . . . , X12) of a second control signal, and twelve coded modulation symbols (Y1, . . . , Y12) of a third control signal are carried on the distributed tiles of the respective control channel regions.

Figure 27:
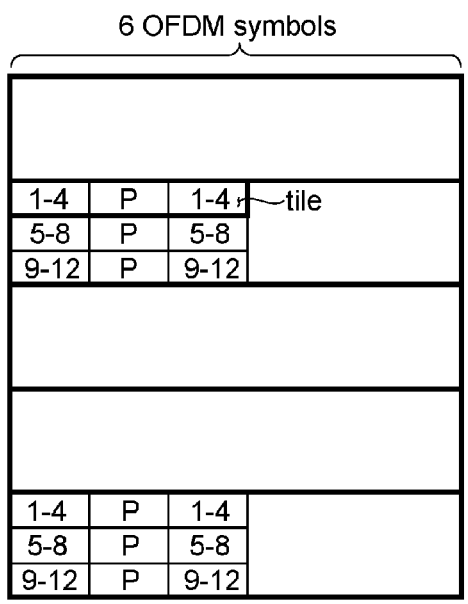
FIG. 27 shows a method of carrying a control signal on a control channel region according to still another embodiment of the present invention.

FIG. 27 shows a method of carrying a control signal on a control channel region according to still another embodiment of the present invention.

Referring to FIG. 27, it is assumed that tiles have a size of four subcarriers contiguous in the frequency domain on three OFDM symbols in the time domain, and a control channel region includes two tiles. Pilot subcarriers are allocated to the middle OFDM symbols of the tiles, and data subcarriers are allocated to OFDM symbols at both sides of the tiles. The control channel region includes sixteen data subcarriers and eight pilot subcarriers. Such control channel regions may be used as an ACK/NACK channel for transmitting a 1-bit ACK/NACK signal.

Two tiles included in a single control channel region may be distributedly disposed in the frequency domain. A control signal is expressed by four modulation symbols, and each modulation symbol is spread by a spreading code with a length of 4 and then allocated to the sixteen data subcarriers included in the control channel region. Because a single tile includes four pilots (P), four mutually orthogonal spreading codes may be applied thereto. Four control signals may be multiplexed into a single control channel region. Here, the numbers shown on the tiles indicate multiplexed control signals. Twelve control signals can be transmitted via three control channel regions, namely, six tiles.

Figure 28:
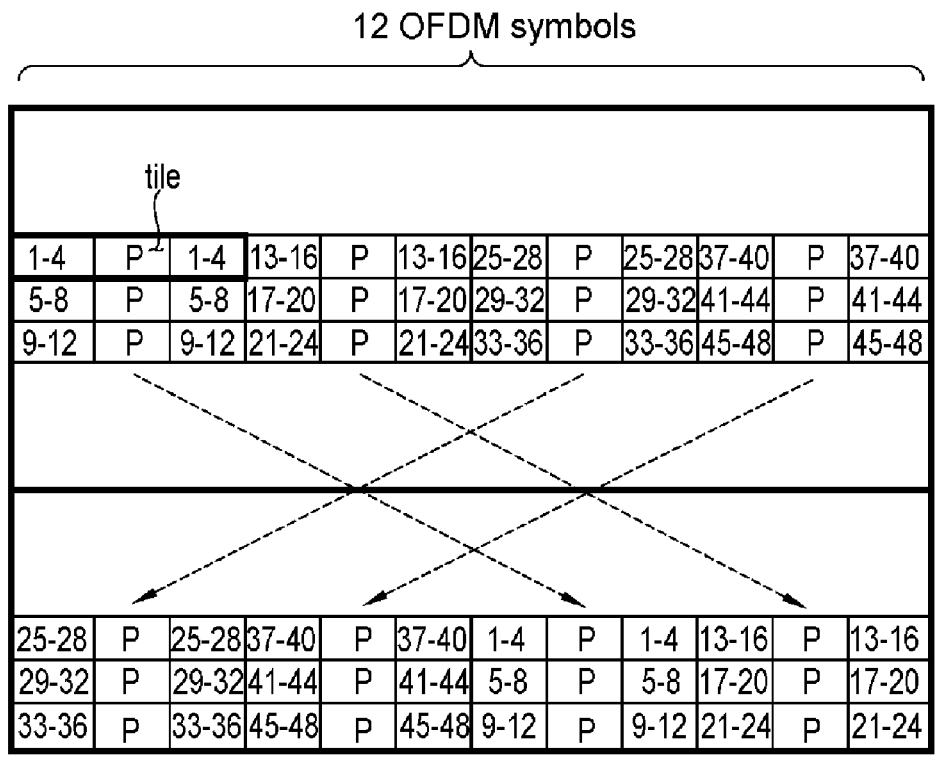
FIG. 28 shows a method of carrying a control signal on a control channel region according to still another embodiment of the present invention.

FIG. 28 shows a method of carrying a control signal on a control channel region according to still another embodiment of the present invention.

Referring to FIG. 28, a basic range of control channel regions is determined to have twelve OFDM symbols on the same assumption as that of the case shown in FIG. 27. Two tiles included in a single control channel region are distributedly disposed in the frequency domain and in the time domain. A second tile is disposed at a position shifted by six OFDM symbols from a first tile within the basic range of the control channel regions. It is shown that tiles of twelve control channel regions are all distributed with the same size in the frequency domain, but the degree in which tiles included in a single control channel region are distributed in the frequency domain may vary at each control channel region. The degree in which tiles included in a single control channel region are distributed in the time domain may vary at each control channel region.

Figure 29:
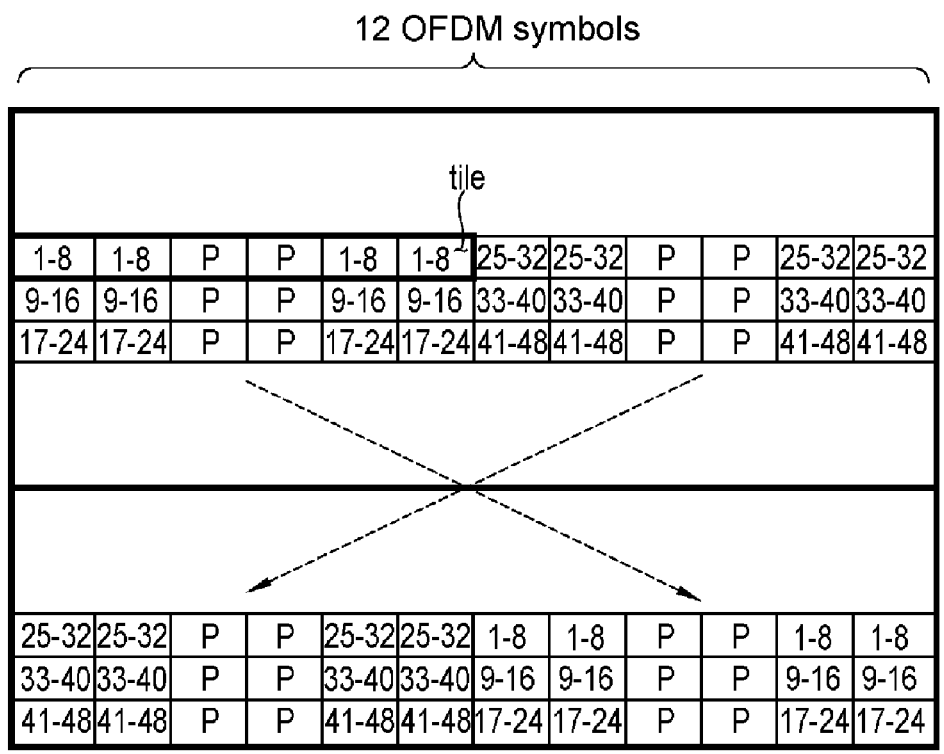
FIG. 29 shows a method of carrying a control signal on a control channel region according to still another embodiment of the present invention.

FIG. 29 shows a method of carrying a control signal on a control channel region according to still another embodiment of the present invention.

Referring to FIG. 29, tiles have a size of four subcarriers contiguous in the frequency domain on six OFDM symbols in the time domain, and a control channel region includes two tiles. Pilot subcarriers are allocated to the middle two OFDM symbols of each tile, and data subcarriers are allocated to four OFDM symbols. The control channel region includes 32 data subcarriers and sixteen pilot subcarriers.

When a basic range of the control channel region is twelve OFDM symbols, two tiles included in the single control channel region may be distributedly disposed in the frequency domain and/or time domain. A control signal is expressed by eight modulation symbols, and each modulation symbol is spread by a spreading code with a length of 4 and then allocated to the 32 data subcarriers included in the control channel region. Because a single tile includes four pilots (P), four mutually orthogonal spreading codes may be applied thereto. Eight control signals may be multiplexed into the single control channel region. The numbers shown on the tiles indicate multiplexed control signals. 24 control signals can be transmitted via three control channel regions, namely, six tiles. The degree in which tiles included in the single control channel region are distributed in the frequency domain or in the time domain may vary at each control channel region.

FIG. 30 shows a method of carrying a control signal on a control channel region according to still another embodiment of the present invention.

Referring to FIG. 30, tiles have a size of four subcarriers contiguous in the frequency domain on two OFDM symbols in the time domain, and a control channel region includes three tiles. Pilot subcarriers are allocated to one OFDM symbol of each tile, and data subcarriers are allocated to the other OFDM symbol. The control channel region includes 12 data subcarriers and 12 pilot subcarriers.

When a basic range of the control channel region is six OFDM symbols, three tiles included in the single control channel region may be distributedly disposed in the frequency domain and/or time domain. A control signal is expressed by three modulation symbols, and each modulation symbol is spread by a spreading code with a length of 4 and then allocated to the 12 data subcarriers included in the control channel region. Because a single tile includes four pilots (P), four mutually orthogonal spreading codes may be applied thereto. Four control signals may be multiplexed into the single control channel region. The numbers shown on the tiles indicate multiplexed control signals. The degree in which tiles included in the single control channel region are distributed in the frequency domain or in the time domain may vary at each control channel region.

FIG. 31 shows a method of carrying a control signal on a control channel region according to still another embodiment of the present invention.

Referring to FIG. 31, tiles have a size of four subcarriers contiguous in the frequency domain on four OFDM symbols in the time domain, and a control channel region includes three tiles. Pilot subcarriers are allocated to two OFDM symbols of each tile, and data subcarriers are allocated to another two OFDM symbols. The control channel region includes 24 data subcarriers and 24 pilot subcarriers.

When a basic range of the control channel region is twelve OFDM symbols, three tiles included in the single control channel region may be distributedly disposed in the frequency domain and/or time domain. A control signal is expressed by six modulation symbols, and each modulation symbol is spread by a spreading code with a length of 4 and then allocated to the 24 data subcarriers included in the control channel region. Because a single tile includes eight pilots (P), eight mutually orthogonal spreading codes may be applied thereto. Eight control signals may be multiplexed into the single control channel region. The numbers shown on the tiles indicate multiplexed control signals. The degree in which tiles included in the single control channel region are distributed in the frequency domain or in the time domain may vary at each control channel region.

FIG. 32 shows a method of carrying a control signal on a control channel region according to still another embodiment of the present invention.

Referring to FIG. 32, tiles have a size of four subcarriers contiguous in the frequency domain on three OFDM symbols in the time domain, and a control channel region includes three tiles. Pilot subcarriers are allocated to one OFDM symbol of each tile, and data subcarriers are allocated to another two OFDM symbols. The control channel region includes 24 data subcarriers and 12 pilot subcarriers.

When a basic range of the control channel region is nine OFDM symbols, the three tiles included in the single control channel region may be distributedly disposed in the frequency domain and/or time domain. A control signal is expressed by six modulation symbols, and each modulation symbol is spread by a spreading code with a length of 4 and then allocated to the 24 data subcarriers included in the control channel region. Because a single tile includes four pilots (P), four mutually orthogonal spreading codes may be applied thereto. Four control signals may be multiplexed into the single control channel region. The numbers shown on the tiles indicate multiplexed control signals. The degree in which tiles included in the single control channel region are distributed in the frequency domain or in the time domain may vary at each control channel region.

The method for displaying control channel regions in the uplink frame has been described, and it can be also applicable as it is for disposition of control channel regions in a downlink frame.

Every function as described above can be performed by a processor such as a microprocessor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method of transmitting control signals in a wireless communication system, the method comprising:
spreading a first control signal with a first orthogonal code to generate a first spread control signal;
spreading a second control signal with a second orthogonal code, different from the first orthogonal code, to generate a second spread control signal; and
transmitting the first spread control signal and the second spread control signal in a control channel region;

wherein the control channel region comprises a plurality of tiles includes 4 subcarriers by 3 orthogonal frequency division multiplexing (OFDM) symbols;

wherein the plurality of tiles are divided into a first set of tiles and a second set of tiles, and the first set of tiles is disposed in preceding 3 OFDM symbols and the second set of tiles is disposed in 3 OFDM symbols next to the preceding 3 OFDM symbols; and wherein tiles in the first set are not contiguous with each other in frequency domain and tiles in the second set are not contiguous with each other in frequency domain.

2. The method of claim 1, wherein the control channel region is disposed in an uplink frame.

3. The method of claim 1, wherein the control channel region is disposed in a downlink frame.

4. The method of claim 1, wherein the control channel region is transmitted via a MAP, an FCH, or a broadcast channel.

5. A wireless device configured to transmit control signals in a wireless communication system, the wireless device comprising a processor configured to:

spread a first control signal with a first orthogonal code to generate a first spread control signal;

spread a second control signal with a second orthogonal code, different from the first orthogonal code, to generate a second spread control signal; and transmit the first spread control signal and the second spread control signal in a control channel region;

wherein the control channel region comprises a plurality of tiles includes 4 subcarriers by 3 orthogonal frequency division multiplexing (OFDM) symbols;

wherein the plurality of tiles are divided into a first set of tiles and a second set of tiles, and the first set of tiles is disposed in preceding 3 OFDM symbols and the second set of tiles is disposed in 3 OFDM symbols next to the preceding 3 OFDM symbols; and wherein tiles in the first set are not contiguous with each other in frequency domain and tiles in the second set are not contiguous with each other in frequency domain.

* * * * *